(12) United States Patent
Narita et al.

(10) Patent No.: US 10,236,021 B2
(45) Date of Patent: Mar. 19, 2019

(54) MAGNETIC RECORDING APPARATUS HAVING MAGNETIC FLUX CONTROL PART AND MAGNETIC RECORDING HEAD HAVING MAGNETIC FLUX CONTROL PART

(71) Applicant: Kabushiki Kaisha Toshiba, Tokyo (JP)

(72) Inventors: Naoyuki Narita, Fujisawa Kanagawa (JP); Masayuki Takagishi, Kunitachi Tokyo (JP); Kenichiro Yamada, Tokyo (JP); Tomoyuki Maeda, Kawasaki Kanagawa (JP); Akihiko Takeo, Kokubunji Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/687,570

(22) Filed: Aug. 28, 2017

(65) Prior Publication Data

US 2018/0268848 A1    Sep. 20, 2018

(30) Foreign Application Priority Data

Mar. 17, 2017   (JP) .................. 2017-053459

(51) Int. Cl.
*G11B 5/127*   (2006.01)
*G11B 5/33*    (2006.01)
(Continued)

(52) U.S. Cl.
CPC ............. *G11B 5/33* (2013.01); *G11B 5/1278* (2013.01); *G11B 5/23* (2013.01); *G11B 5/3133* (2013.01); *G11B 5/3153* (2013.01); *G11B 5/3983* (2013.01)

(58) Field of Classification Search
CPC ....... G11B 5/1278; G11B 5/23; G11B 5/3133; G11B 5/3153
(Continued)

(56) References Cited

U.S. PATENT DOCUMENTS 8,564,903 B2   10/2013   Min et al.
8,824,104 B1    9/2014   Koui et al.
(Continued)

FOREIGN PATENT DOCUMENTS

| JP | 2013-47999 | 3/2013 |
|---|---|---|
| JP | 2014-130672 | 7/2014 |
| JP | 2015-11745 | 1/2015 |

*Primary Examiner* — Jefferson Evans
(74) *Attorney, Agent, or Firm* — Finnegan, Henderson, Farabow, Dunner, L.L.P.

(57) ABSTRACT

A magnetic recording apparatus includes a magnetic recording medium; a magnetic recording head including a first magnetic pole part, a second magnetic pole part, and a magnetic flux control part provided between the first magnetic pole part and the second magnetic pole part, wherein the magnetic flux control part includes a first layer provided between the first magnetic pole part and the second magnetic pole part, a second layer provided between the first magnetic pole part and the first layer, and a third layer provided between the second magnetic pole part and the first layer; an electrode for applying a current to the magnetic flux control part; and an electric circuit for energizing the current to the electrode, wherein an oscillation frequency of magnetization of the magnetic layer is greater than a ferromagnetic resonance frequency of the magnetic recording medium.

20 Claims, 24 Drawing Sheets

(51) Int. Cl.
*G11B 5/39* (2006.01)
*G11B 5/31* (2006.01)
*G11B 5/23* (2006.01)

(58) Field of Classification Search
USPC .......................... 360/119.02, 119.03, 125.3
See application file for complete search history.

(56) References Cited

U.S. PATENT DOCUMENTS

| | | |
|---|---|---|
| 9,318,131 B2 | 4/2016 | Tian et al. |
| 2009/0080106 A1* | 3/2009 | Shimizu ................. G11B 5/314 360/75 |
| 2012/0002331 A1* | 1/2012 | Oikawa ................ G11B 5/3133 360/328 |
| 2012/0224283 A1* | 9/2012 | Sato .................... G11B 5/3133 360/324.11 |
| 2012/0243127 A1* | 9/2012 | Iwasaki ................ G01R 33/093 360/290 |
| 2012/0275061 A1* | 11/2012 | Takagishi ................. G11B 5/02 360/123.05 |
| 2014/0063648 A1* | 3/2014 | Shiroishi ............. G11B 5/3909 360/75 |
| 2014/0139952 A1* | 5/2014 | Takeo .................. G11B 5/1278 360/125.03 |
| 2015/0002963 A1 | 1/2015 | Tian et al. |
| 2016/0180906 A1* | 6/2016 | Kudo ................... G11B 5/1278 365/158 |

* cited by examiner

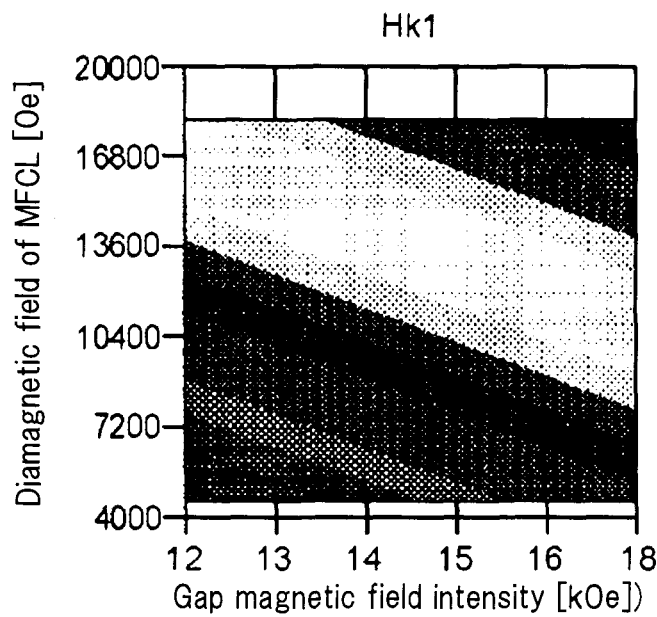
FIG. 18A
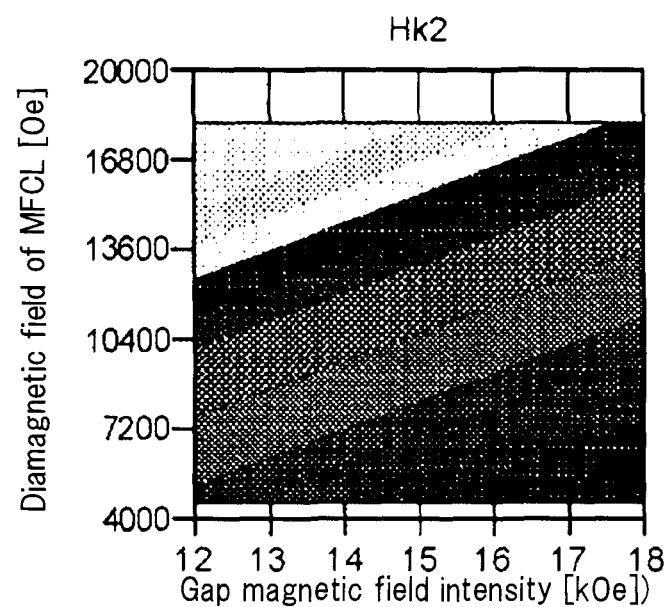
FIG. 18B
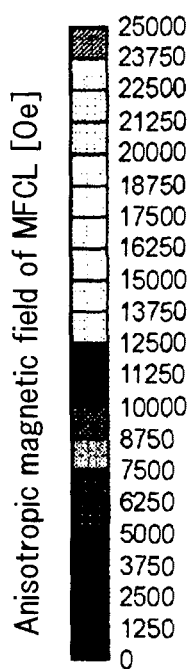

MAGNETIC RECORDING APPARATUS HAVING MAGNETIC FLUX CONTROL PART AND MAGNETIC RECORDING HEAD HAVING MAGNETIC FLUX CONTROL PART

CROSS REFERENCE TO RELATED APPLICATION(S)

This application is based upon and claims the benefit of priority from the prior Japanese Patent Application No. 2017-053459, filed on Mar. 17, 2017, the entire contents of which are incorporated herein by reference.

FIELD

Embodiments of the present invention relate to a magnetic recording apparatus and a magnetic recording head.

BACKGROUND

In a magnetic recording apparatus, information is recorded on a magnetic storage medium such as hard disk drive (HDD). In the magnetic recording apparatus, improvement for increasing record density has been desired.

BRIEF DESCRIPTION OF DRAWINGS

FIG. 18A and FIG. 18B are diagrams illustrating a relationship between gap magnetic field intensity and a diamagnetic field of a magnetic flux control layer, of an anisotropic magnetic field margin in a magnetic recording apparatus according to an embodiment;

DESCRIPTION OF EMBODIMENTS

Figure 1:
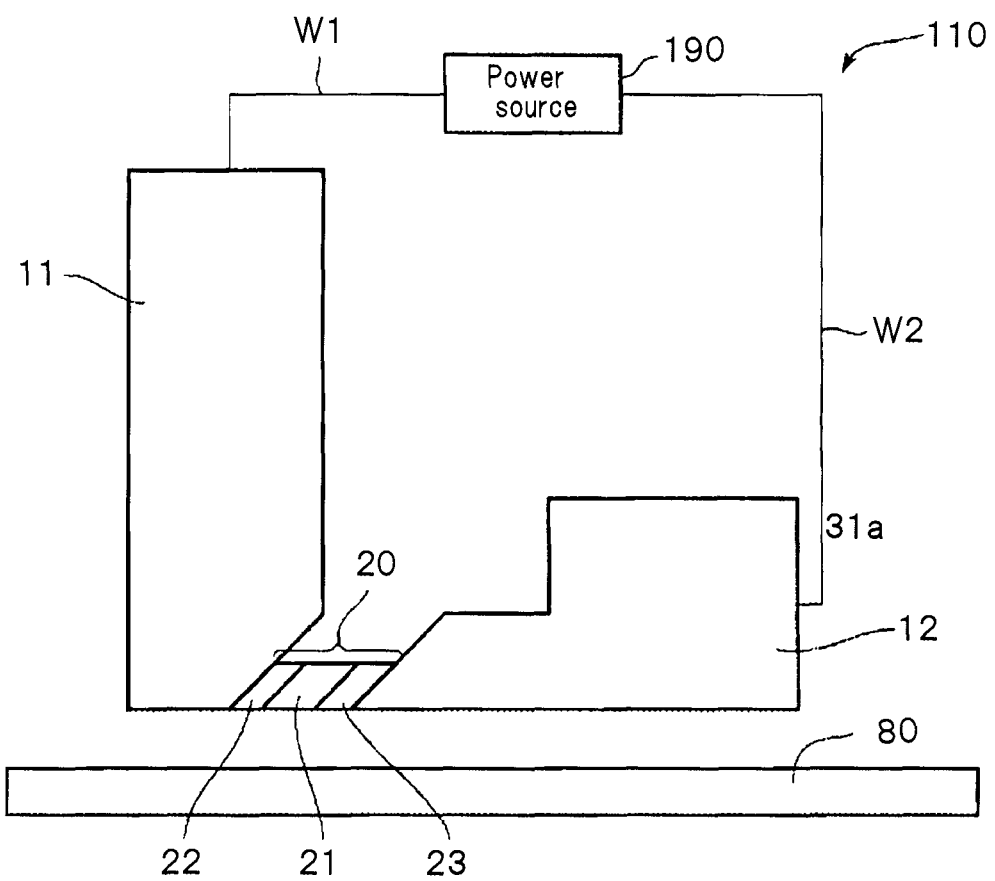
FIG. 1 is a diagram schematically illustrating a magnetic recording apparatus according to a first embodiment.

According to an embodiment, a magnetic recording apparatus includes: a magnetic recording medium; a magnetic recording head, which is capable of recording data on the magnetic recording medium, the magnetic recording head including: a first magnetic pole part; a second magnetic pole part; and a magnetic flux control part provided between the first magnetic pole part and the second magnetic pole part, wherein the magnetic flux control part comprises: a first layer provided between the first magnetic pole part and the second magnetic pole part and including at least one element selected from the group consisting of Fe, Co, and Ni; a second layer provided between the first magnetic pole part and the first layer and including at least one element selected from the group consisting of Cu, Ag, and Au; and a third layer provided between the second magnetic pole part and the first layer and including at least one element selected from the group consisting of Cu, Ag, and Au; an electrode for applying a current to the magnetic flux control part; and an electric circuit for energizing the current to the electrode, wherein an oscillation frequency of magnetization of the first layer is greater than a ferromagnetic resonance frequency of the magnetic recording medium, is provided.

Hereinafter, embodiments will be described with reference to the drawings.

Note that the drawings are schematic or conceptual, and the relationship between the thickness and the width of each portion, the ratio of the sizes between the portions, and the like are not necessarily the same as the actual ones. In addition, even in the case of representing the same portion, the dimensions or ratios of the portions may be represented differently depending on the drawings.

In the present specification and each drawing, the same reference numerals are assigned to the same elements as those described above with reference to the previous drawings, and detailed descriptions thereof will be omitted as appropriate.

First Embodiment

FIG. 1 is a schematic cross-sectional view schematically illustrating a magnetic recording apparatus according to a first embodiment. As illustrated in FIG. 1, the magnetic recording apparatus according to this embodiment includes a magnetic recording medium 80 and a magnetic recording head 110 magnetically writing information on the magnetic recording medium 80. The magnetic recording head 110 of the magnetic recording apparatus includes a first magnetic pole part 11, a second magnetic pole part 12, a magnetic flux control part 20 provided between the first magnetic pole part 11 and the second magnetic pole part 12, and terminals connected to a power source for supplying a current to the magnetic flux control part 20. The terminals are not particularly illustrated.

Although not particularly illustrated in the drawing, there are a coil for magnetizing the first magnetic pole part 11 and the second magnetic pole part 12, and an electric circuit for energizing a recording current to the coil. By energizing the recording current to the coil, a magnetic field is generated by the magnetic recording head 110, and information is recorded on the magnetic recording medium 80. In addition, for example, a side shield or a trailing shield (not illustrated) other than the second magnetic pole part 12 may be included. An insulating part (not illustrated) is provided around the first magnetic pole part 11, the second magnetic pole part 12, and the magnetic flux control part 20.

For example, in the vicinity of an air bearing surface (ABS) of the magnetic recording head 110, the first magnetic pole part 11 is separated from the second magnetic pole part 12 along a down track direction. For example, a portion of the first magnetic pole part 11 is separated from the second magnetic pole part 12 along the down track direction. At this time, a portion apart from the first magnetic pole part 11 is filled with an insulator. The magnetic recording head 110 and the magnetic recording medium 80 relatively move along the down track direction. Due to this, information is recorded at an arbitrary position on the magnetic recording medium 80.

As illustrated in FIG. 1, the magnetic flux control part 20 includes a first layer 21 as a magnetic flux control layer, a second layer 22, and a third layer 23.

The first layer 21 includes at least one first element selected from the group consisting of iron (Fe), cobalt (Co), and nickel (Ni). For example, the first layer 21 is FeCo. For example, the first layer 21 is referred to as a magnetic flux control layer.

The second layer 22 includes a metal. For example, the second layer 22 includes at least one selected from the group consisting of copper (Cu), silver (Ag), and gold (Au). The second layer 22 is provided between the first magnetic pole part 11 and the first layer 21.

The third layer 23 includes a metal. For example, the third layer 23 includes at least one selected from the group consisting of Cu, Ag, and Au. The third layer 23 is provided between the second magnetic pole part 12 and the first layer 21.

The first magnetic pole part 11 includes a portion that overlaps the magnetic flux control part 20. The second magnetic pole part 12 includes a portion that overlaps the magnetic flux control part 20. A distance between the overlapping positions of both along a lamination direction of the magnetic flux control part 20 corresponds to a write gap length. In an embodiment, the write gap length is, for example, 15 nm or more and 30 nm or less.

As illustrated in FIG. 1, in the magnetic recording head 110, for example, a first wiring W1 and a second wiring W2 are provided. These wirings W1 and W2 are respectively connected the first magnetic pole part 11 and the second magnetic pole part 12 to a power source 190 via terminals (not illustrated).

The power source 190 is capable of energizing a current to the magnetic flux control part 20 via the wirings and the terminals. In this example, the first wiring W1 is connected to the first magnetic pole part 11, and the second wiring W2 is connected to the second magnetic pole part 12.

By passing a current through such the magnetic flux control part 20, it becomes easy to effectively apply the magnetic field (recording magnetic field) generated by the magnetic recording head 110 to the magnetic recording medium 80.

For example, as the write gap length is reduced so as to improve record density, most of the recording magnetic field generated from the first magnetic pole part 11 is directed toward the second magnetic pole part 12 directly through the write gap, without passing through the magnetic recording medium 80. Therefore, it is difficult for the magnetic field generated from the first magnetic pole part 11 to effectively reach the magnetic recording medium 80.

For example, by providing the magnetic flux control part 20 between the first magnetic pole part 11 and the second magnetic pole part 12 as described above and allowing a current to flow through the magnetic flux control part 20, a direction of magnetization of the first layer 21 of the magnetic flux control part 20 is opposite to a direction of the magnetic field that exits from the first magnetic pole part 11 and reaches the second magnetic pole part 12 via the write gap. Due to this, the magnetic field emitted from the first magnetic pole part 11 is prevented from directly flowing into the second magnetic pole part 12. As a result, most of the magnetic field emitted from the first magnetic pole part 11 is directed toward the magnetic recording medium 80. Therefore, even if the write gap has become to be reduced and narrowed, a recording magnetic field is effectively applied to the recording medium 80. This makes it possible to improve for increasing the record density.

Incidentally, as one means for improving capability of record density, microwave-assisted magnetic recording (MAMR) is considered.

In the microwave-assisted magnetic recording (MAMR), for example, a high frequency magnetic field generation source called a spin torque oscillator (STO) is provided within a write gap between magnetic pole parts. By matching a frequency of the high frequency magnetic field generated from the STO with a natural frequency (ferromagnetic resonance frequency) of the magnetization in a magnetic recording medium, a ferromagnetic resonance phenomenon of the recording medium magnetization is induced to improve the recording capability. In the microwave-assisted magnetic recording (MAMR), since the above resonance phenomenon is used, a medium matching an oscillation frequency of the STO determined by the characteristics of the magnetic recording head is required.

In addition, a granular medium used for a magnetic recording has different magnetic characteristics for each magnetic grain in its structure. That is, a saturation magnetic field or an anisotropic magnetic field is different for each magnetic grain. Such dispersion of the magnetic characteristics comes to the surface as dispersion of recording magnetic field intensity necessary for magnetization inversion of the magnetization of the magnetic grains even in a general recording system. The ferromagnetic resonance frequency of the recording medium magnetization is changed by the magnetic characteristics of such magnetic grains. This means that the ferromagnetic resonance frequency is changed according to a variation in magnetic characteristics or a surrounding magnetization state. In other words, in the microwave-assisted magnetic recording (MAMR), it is considered that there occurs dispersion of the assist effect caused by dispersion of the resonance frequency as well as the dispersion of the magnetization inversion magnetic field intensity caused by the dispersion of magnetic characteristics.

On the other hand, as for the magnetic recording apparatus according to the first embodiment, since the ferromagnetic resonance phenomenon as described is not used, the above problem does not occur.

Figure 2A:
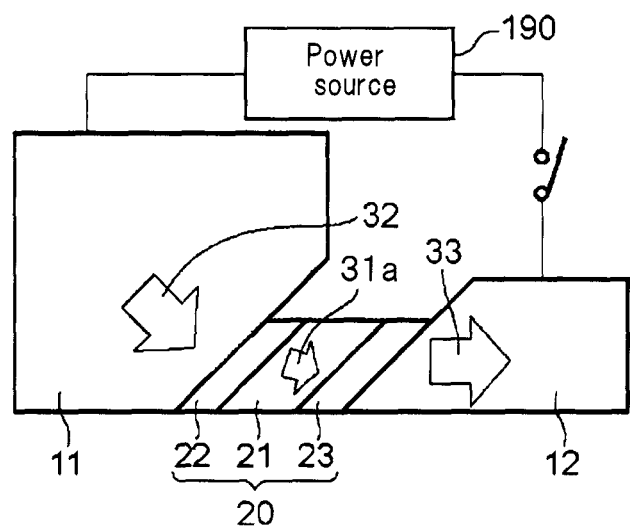
FIG. 2A and FIG. 2B are diagrams schematically illustrating operation state of a magnetic recording apparatus according to an embodiment.
Figure 2B:
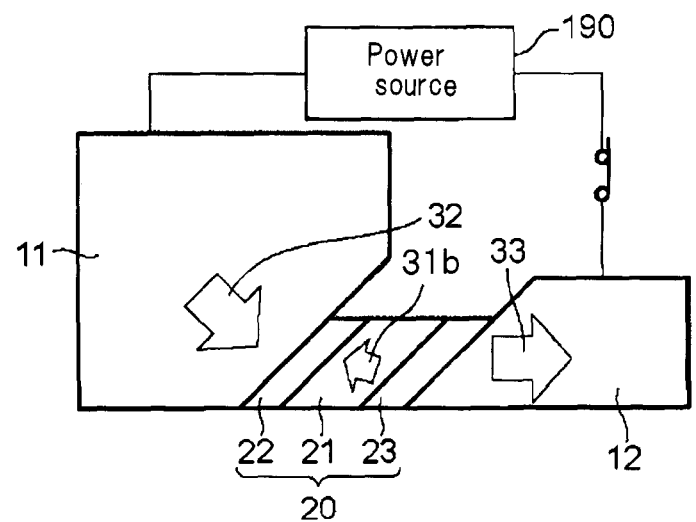

FIG. 2A and FIG. 2B are schematic diagrams schematically illustrating operation states of the magnetic recording apparatus according to the embodiment. The magnetic recording apparatus is referred to as a magnetic flux control type. FIG. 2A illustrates a state in which no current is supplied from the power source 190 to the magnetic flux control part 20.

The magnetization direction near the ABS of the first magnetic pole part 11 is indicated by 32. The magnetization direction near the ABS of the second magnetic pole part 12 is indicated by 33. The magnetization direction of the first layer 21 is indicated by 31.

As illustrated in FIG. 2A, when no current flows through the magnetic flux control part 20, the magnetization direction 31*a* of the first layer 21 is a direction from the first magnetic pole part 11 to the second magnetic pole part 12. This is because a magnetic field (gap magnetic field) is generated from the first magnetic pole part 11 through the first layer 21 toward the second magnetic pole part 12. That is, the first layer 21 has a magnetization component parallel to the gap magnetic field.

On the other hand, as illustrated in FIG. 2B, it is considered that the magnetization direction 31*a* of the first layer 21 is inverted to a magnetization direction 31*b* by passing a current through the magnetic flux control part 20. That is, the magnetization of the first layer 21 has a component antiparallel to the gap magnetic field. Therefore, the gap magnetic field hardly passes through the first layer 21, and a portion thereof flows out toward the magnetic recording medium. As a result, the magnetic field intensity or distribution applied to the magnetic recording medium 80 can be improved, and thus, the record density can be increased. At this time, when the oscillation frequency of the magnetization in the first layer 21 is greater than the natural frequency of the magnetization of the magnetic recording medium, the ferromagnetic resonance phenomenon does not occur.

As described above, in the magnetic recording apparatus according to an embodiment, an effective recording magnetic field is applied to the magnetic recording medium 80 by controlling the magnetization direction in the first layer 21 with a current. This makes it possible to improve the record density without using the ferromagnetic resonance phenomenon.

Figure 3:
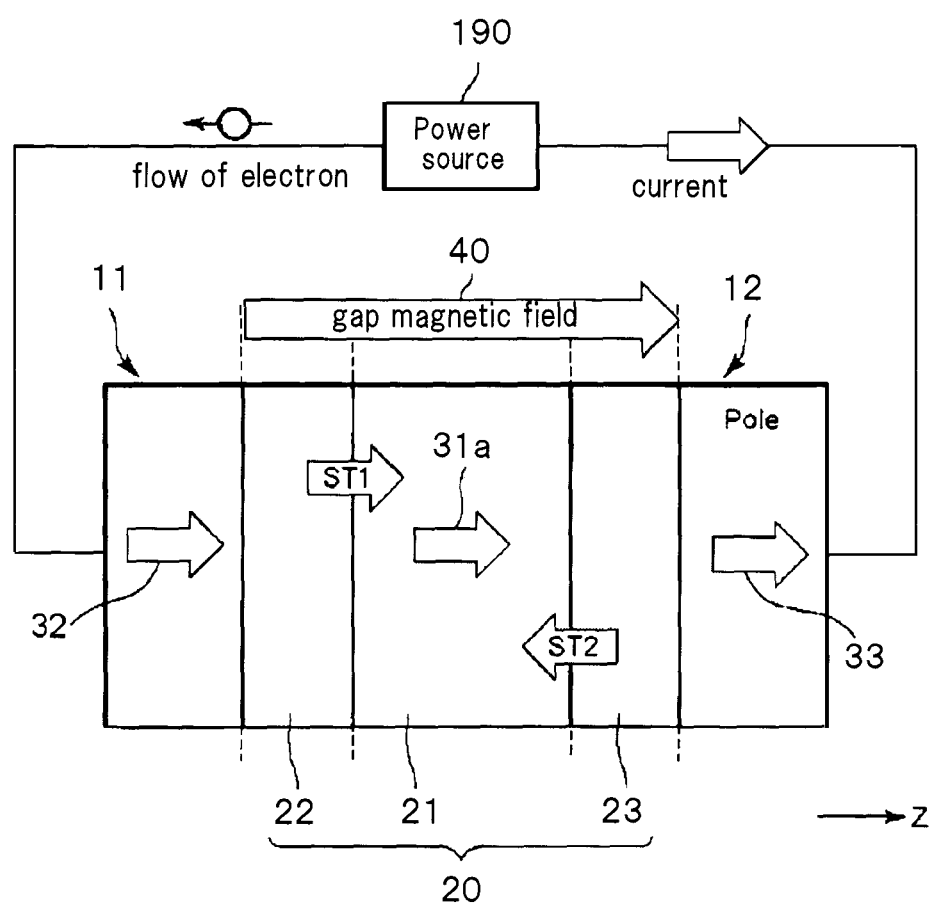
FIG. 3 is a diagram illustrating a simulation model of a magnetic recording apparatus according to an embodiment.

FIG. 3 is a diagram illustrating a model of an inversion simulation of the first layer 21 of the magnetic recording apparatus according to the embodiment.

A structure of a model in the magnetic recording head is as follows.

A saturation magnetization Ms of the first layer 21 is 1.0 T and an anisotropic magnetic field Hk is 0. A first film thickness t1 of the first layer 21 is 12.5 nm, for example.

A second film thickness t2 of the second layer 22 was set to be 2 nm, which was sufficiently smaller than a spin diffusion length.

A third film thickness t3 of the third layer 23 was set to be 2 nm, which was sufficiently smaller than the spin diffusion length.

A physical property value of the first layer 21 corresponds to, for example, Permalloy.

The second layer 22 corresponds to, for example, Cu.

The third layer 23 corresponds to, for example, Cu.

In the magnetic recording head 110 including such a magnetic flux control part 20, the gap magnetic field 40 is applied from the first magnetic pole part 11 toward the second magnetic pole part 12 by energizing a recording current to the coil. When the first layer 21 is not provided, the magnitude of the gap magnetic field 40 is 15 kOe. Further, a current is supplied to the magnetic flux control part 20 by the power source 190. The current flowing from the first magnetic pole part 11 to the second magnetic pole part 12 is set as positive.

FIG. 3 is a diagram schematically illustrating the directions of spin torques ST1 and ST2 of the first layer 21. In this drawing, a case where a current is negative is illustrated. That is, the current flows from the second magnetic pole part 12 to the first magnetic pole part 11. Electrons spin-polarized through the first magnetic pole part 11 impart a transmission type spin torque ST1 to the magnetization of the first layer 21 through the second layer 22. The spin polarizability of electrons at this interface was set to 0.5. The spin accumulated in the third layer 23 in the vicinity of the second magnetic pole part 12 is spin-polarized in a direction opposite to a direction of the second magnetic pole part 12 and imparts a reflection type spin torque ST2 to the first layer 21. The spin polarizability of electrons at this interface was set to 0.3.

The first layer 21, the second layer 22, and the third layer 23 were set to have an area of 40×40 nm$^2$ in a direction perpendicular to a current energizing direction.

At this time, a change in the magnetization of the first layer 21 when the current density supplied to the magnetic flux control part 20 is changed is obtained by a simulation based on LLG (Landau=Lifshitz=Gilbert) equation.

Figure 4:
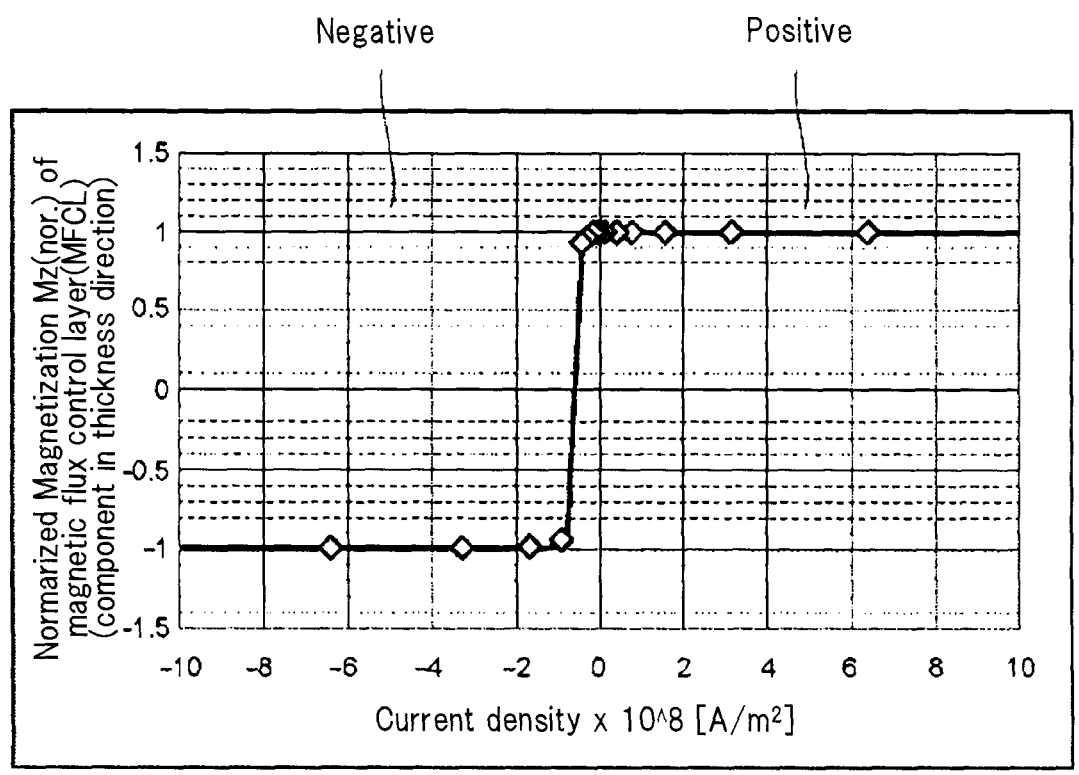
FIG. 4 is a diagram illustrating a current density dependency of a magnetic flux control layer magnetization in a magnetic recording apparatus according to an embodiment.

FIG. 4 is a diagram illustrating a current density dependency of a magnetic flux control layer (MFCL) of magnetization in the magnetic recording apparatus according to the embodiment.

A horizontal axis in FIG. 4 represents a current density supplied to the magnetic flux control part 20. A vertical axis represents a normalized magnetization of the first layer 21 as the magnetic flux control layer.

When the normalized magnetization Mz is "1", it corresponds to the fact that the magnetization of the first layer 21 is one direction. When the normalized magnetization Mz is "−1", it corresponds to the fact that the magnetization of the first layer 21 is an opposite direction. When the magnetization Mz is positive, the magnetization direction 31 of the first layer 21 has a component parallel to the direction of the gap magnetic field 40. When the magnetization Mz is negative, the magnetization direction 31 of the first layer 21 has a component antiparallel to the direction of the gap magnetic field 40.

As illustrated in FIG. 4, in the magnetic recording head of the magnetic recording apparatus according to an embodiment, the magnetization of the first layer 21 has a component antiparallel to the gap magnetic field 40 in a region where the current density becomes negative.

The reason why the polarity dependence of the current exists is that the relationship between the spin torques ST1 and ST2 acting on the first layer 21 is changed according to an electron inflow direction. This is due to the fact that the relationship between the transmission type spin torque and the reflection type spin torque is inverted. That is, putting it simply, the magnetization inversion occurs in the first layer 21 only when the spin torque in the opposite direction to the gap magnetic field 40 is greater than the spin torque in the same direction as the gap magnetic field 40 (i.e. the magnetization of the first layer 21 is flipped in a case where a negative spin torque is dominantly applied, based upon the current.).

Figure 5A:
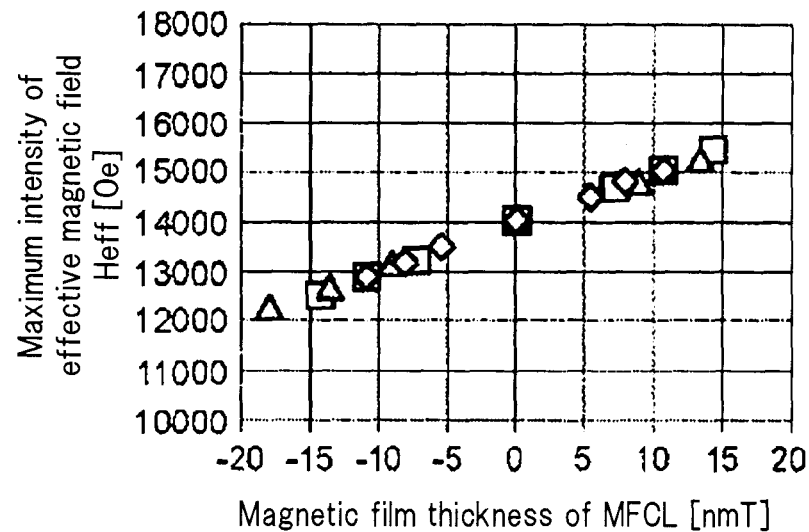
FIG. 5A and FIG. 5B are diagrams illustrating recording capability improvement effects of a magnetic recording head in a magnetic recording apparatus according to an embodiment.
Figure 5B:
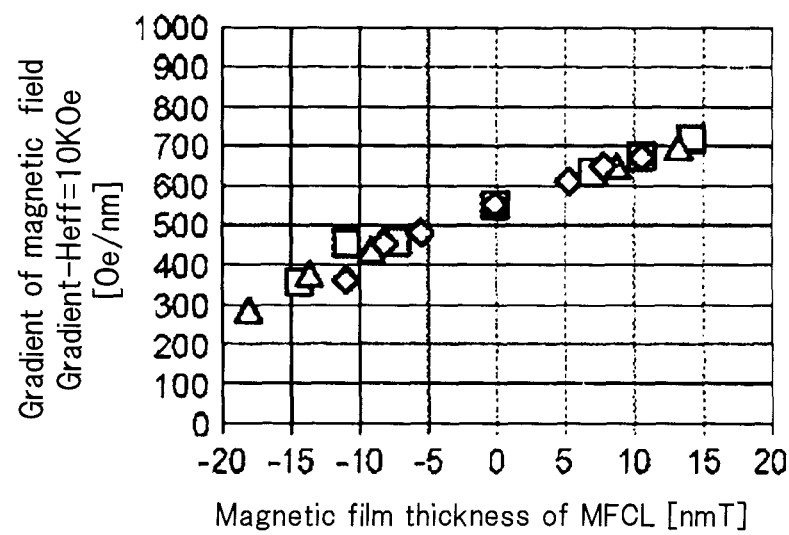

FIG. 5A and FIG. 5B are diagrams illustrating recording capability improvement effects of the magnetic recording head of the magnetic recording apparatus according to the embodiment. A horizontal axis represents a magnetic film thickness that is the product of the saturation magnetization and the film thickness of the first layer 21.

A negative magnetic film thickness indicates a state in which the magnetization direction 31 of the first layer 21 is parallel to the gap magnetic field 40.

A positive magnetic film thickness indicates a state in which the magnetization direction 31 of the first layer 21 is antiparallel to the gap magnetic field 40.

A case where the magnetic film thickness is 0 indicates a case where the first layer 21 does not exist.

It is assumed that the magnetization of the first layer 21 is in an ideal parallel or antiparallel state with respect to the gap magnetic field 40. At this time, a change in the recording magnetic field distribution when the magnetic film thickness of the first layer 21 is changed is obtained by finite element simulation based on the Maxwell's equation.

A vertical axis in FIG. 5A represents a maximum effective magnetic field intensity. A vertical axis of FIG. 5B represents a magnetic field gradient. Both are indicators showing the characteristics of the magnetic recording head.

As illustrated in FIG. 5A, the maximum effective magnetic field intensity changes in proportion to the magnetic film thickness. When the magnetization direction 31 of the first layer 21 is antiparallel to the gap magnetic field 40, the maximum effective magnetic field intensity is improved.

As illustrated in FIG. 5B, the magnetic field gradient changes approximately in proportion to the magnetic film thickness. When the magnetization direction 31 of the first layer 21 is antiparallel to the gap magnetic field 40, the magnetic field gradient is improved.

Figure 6:
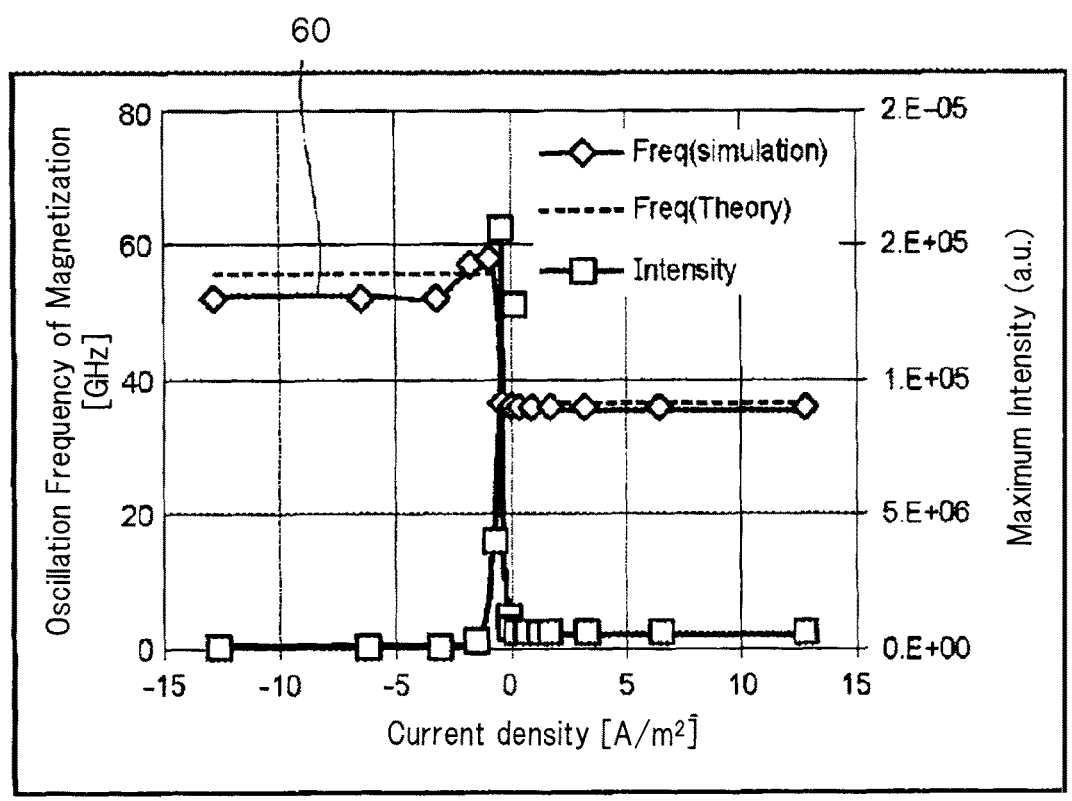
FIG. 6 is a diagram illustrating a relationship between a current density dependency of an oscillation frequency and a spectral intensity of a magnetic flux control layer in a magnetic recording head of a magnetic recording apparatus according to an embodiment.

FIG. 6 is a diagram illustrating a current density dependency of an oscillation frequency of magnetization and a spectral intensity in a stable state of the first layer 21 in the magnetic recording head of the magnetic recording apparatus according to the embodiment.

In the result illustrated in FIG. 4, Fourier transform is performed on the in-plane magnetization component of the first layer 21 to calculate the oscillation frequency of magnetization (hereinafter, simply referred to as a frequency) and the spectral intensity at that frequency. In addition, theoretical values of the frequencies are also shown in the drawing. The theoretical values of the frequencies are based on Kittel's equation (reference: C. Kittel "Introduction to Solid State Physics" John Wiley and Sons p. 523 etc.), the inside of the first layer 21 has a single magnetic domain structure, and the internal magnetic field is estimated and calculated.

As illustrated in FIG. 6, the frequency of the first layer 21 before magnetization inversion is approximately 35 GHz, and the frequency of the first layer 21 after magnetization inversion is approximately 53 GHz. This also shows a good consistency with the theoretically estimated frequency. In addition, a point where the spectral intensity sharply increases is present under the current density condition in the vicinity where the magnetization reverses. In this respect, the magnetization of the first layer 21 oscillates in the in-plane direction.

In the MAMR, it is necessary to make the frequency coincide with the natural frequency of the magnetic recording medium in a region having large spectral intensity illustrated in FIG. 6. However, the spectral intensity is small in the current density region in which the magnetization of the first layer 21 is inverted. Furthermore, the frequency at this point is as extremely large as 53 GHz. In general magnetic recording media, no ferromagnetic resonance phenomenon occurs in such a frequency range.

That is, in the magnetic recording apparatus according to an embodiment, after the magnetization inversion of the first layer 21, only the effect of improving the magnetic recording head characteristics by the magnetic flux control occurs, and the assist effect by the application of the high frequency magnetic field does not occur.

On the other hand, a magnetic coupling phenomenon may be occurred.

The magnetic coupling phenomenon is a phenomenon in which the magnetization in, for example, the first magnetic pole part 11 and the second magnetic pole part 12 of the magnetic recording head is ferromagnetically resonated to create a magnetic coupling state with the high frequency magnetic field generation source. Even in the magnetic recording head of the magnetic recording apparatus according to the present embodiment, a magnetic coupling phenomenon may occur when the first layer 21 passes through a specific frequency band in the magnetization inversion process. It is considered that the magnetic coupling phenomenon lowers the magnetization inversion efficiency of the first layer 21 and increases the inversion current density.

Figure 7:
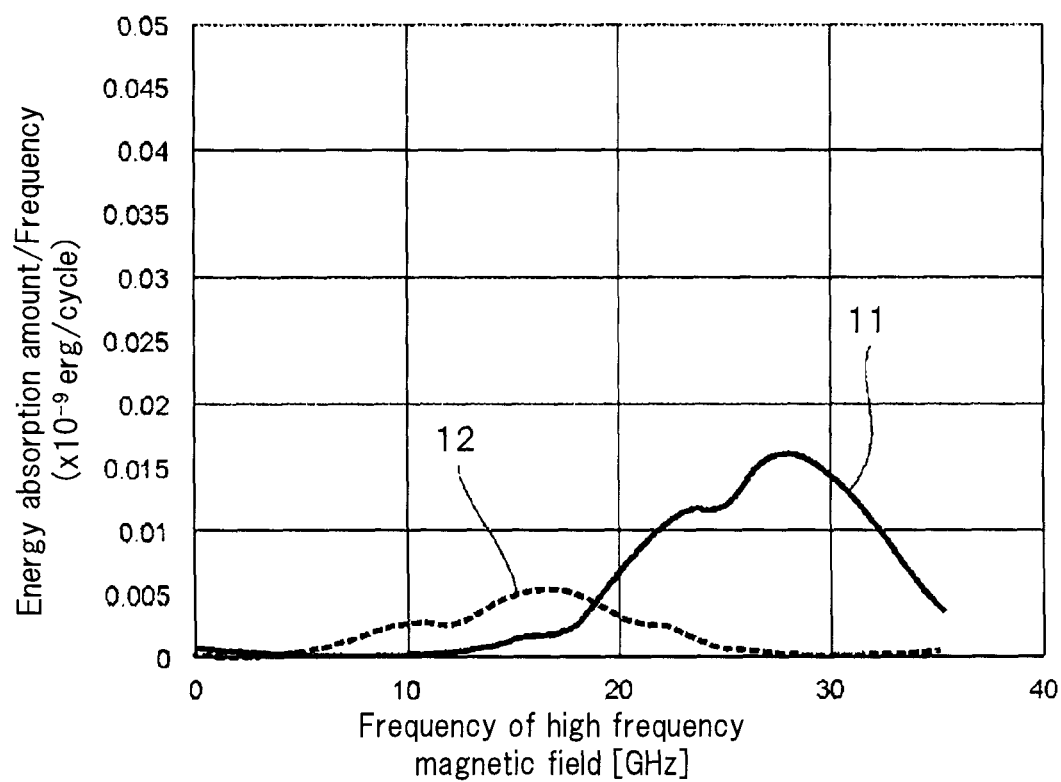
FIG. 7 is a diagram illustrating a relationship between an energy absorption spectrum and a high frequency magnetic field in a magnetic recording head of a magnetic recording apparatus according to an embodiment.

FIG. 7 is a diagram illustrating an absorption spectrum of a high frequency magnetic field in the magnetic recording head 110 of the magnetic recording apparatus according to the embodiment. The absorption spectrum of the high frequency magnetic field is obtained by installing an ideally oscillating high frequency magnetic field generation source in the vicinity of the write gap and calculating the magnetization behavior of each part. A vertical axis represents an energy absorption amount in one cycle of the high frequency magnetic field. A horizontal axis represents the frequency of the high frequency magnetic field. As a peak of the energy absorption amount is higher, the influence of the magnetic coupling becomes greater.

As illustrated in the drawing, the first magnetic pole part 11 has a peak at about 28 GHz and the second magnetic pole part 12 has a peak at about 17 GHz. In addition, the first magnetic pole part 11 and the second magnetic pole part 12 have a wide energy absorption band of about 35 GHz and about 26 GHz, respectively. The magnetic coupling occurs in such a frequency band. That is, in the magnetization inversion process of the first layer 21, it is considered that no magnetic coupling will occur unless it passes through the frequency band.

Figure 8:
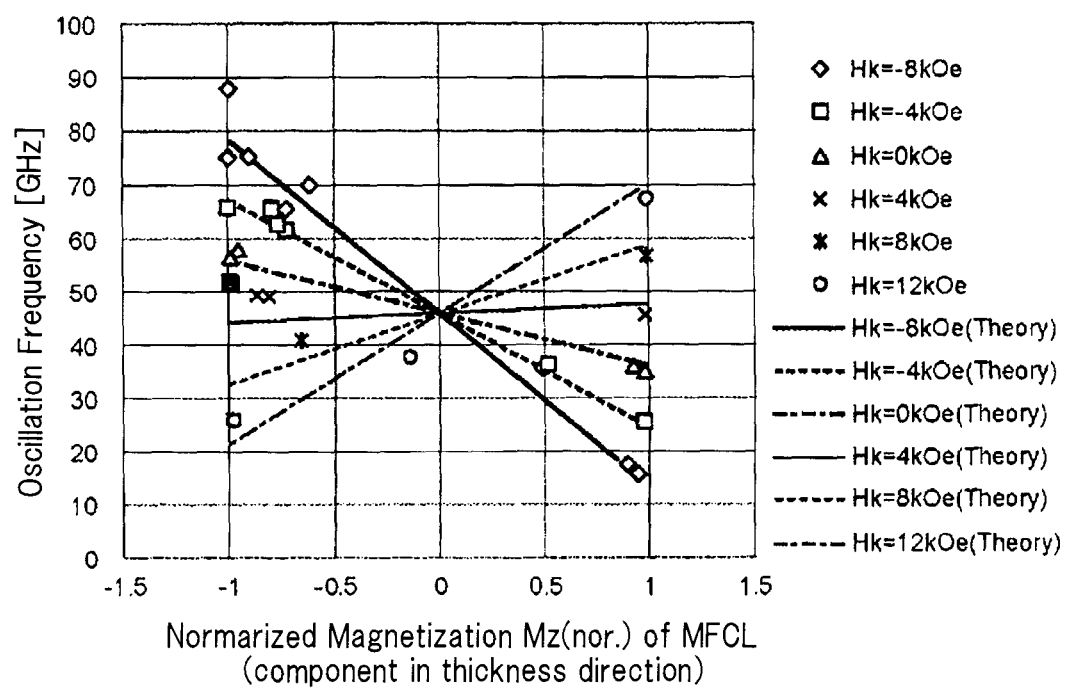
FIG. 8 is a diagram illustrating a relationship between an anisotropic magnetic field of a magnetic flux control layer and an oscillation frequency of a magnetization inversion process in a magnetic recording apparatus according to an embodiment.

FIG. 8 is a diagram illustrating the frequency characteristics of the magnetization inversion process in the first layer 21 of the magnetic recording head 110 of the magnetic recording apparatus according to an embodiment.

A horizontal axis represents a component of the magnetization in a thickness direction of the first layer 21. A vertical axis represents an oscillation frequency of in-plane magnetization at each operating point of the first layer 21.

The in-plane magnetization means a magnetization in a surface direction of the first layer 21.

Characteristics at the time of magnetization inversion estimated from Kittel's equation are indicated by broken lines. An anisotropic magnetic field Hk of the first layer 21 was changed in a range of −8 kOe to 12 kOe.

As illustrated in FIG. 8, even when the first layer 21 has any anisotropic magnetic field, the frequency well coincides with a linear trend shown theoretically. That is, the frequency change in the magnetization inversion process changes approximately to trace this linear trend.

Figure 9:
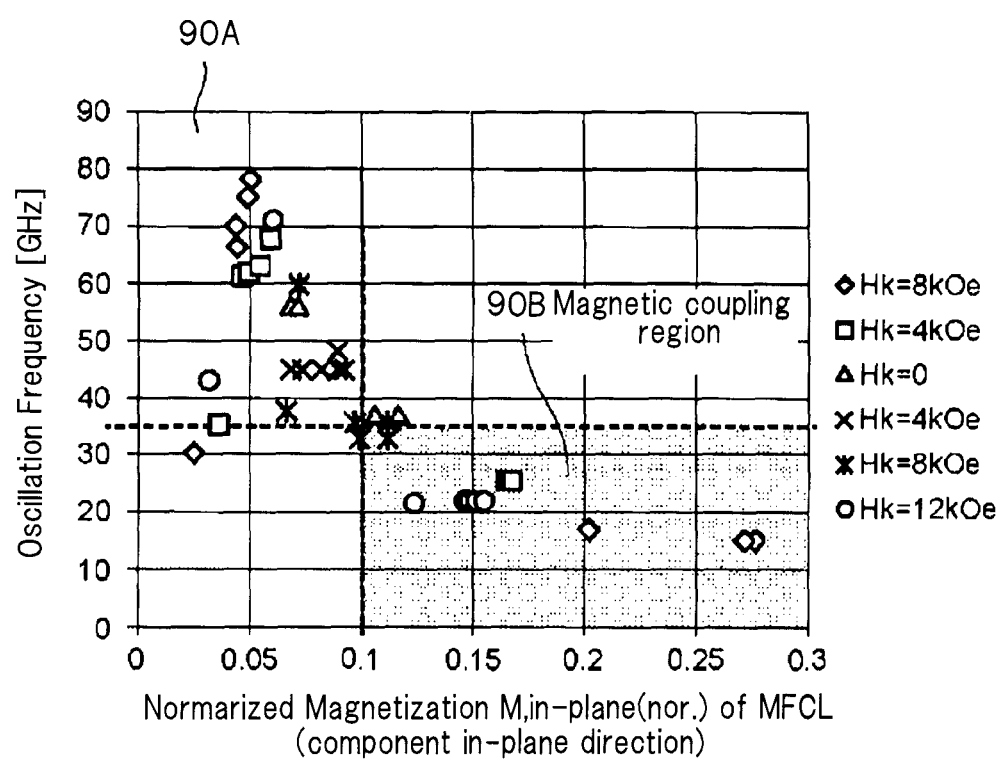
FIG. 9 is a diagram illustrating a relationship between a magnitude of an in-plane magnetization component and an oscillation frequency of an inversion process in a magnetic flux control layer of a magnetic recording apparatus according to an embodiment.

FIG. 9 is a diagram illustrating a relationship between the magnitude of the in-plane magnetization component and the frequency in the magnetization inversion process of the first layer included in the magnetic recording apparatus according to the embodiment. A horizontal axis represents the magnitude of a component of the in-plane magnetization of the first layer 21. A vertical axis represents an oscillation frequency of in-plane magnetization component of the first layer 21.

The effect of the magnetic coupling becomes apparent when the in-plane component of the magnetization of the first layer 21 is large and the frequency of the first layer 21 is applied to the frequency band where the magnetic coupling occurs. That is, in order to suppress the magnetic coupling, it is preferable that the normalized in-plane component is less than 0.1. In addition, it is preferable that the frequency band in the magnetization inversion process of the first layer 21 is higher than 35 GHz. In a region excluding this, the magnetic coupling is remarkable. This region is defined as a magnetic coupling region 90B.

As illustrated in FIG. 9, for example, the first layer 21 having an anisotropic magnetic field of 4 kOe can avoid the magnetic coupling region 90B over the entire magnetization inversion process. Under such conditions, it is considered that the magnetic coupling phenomenon does not become apparent and an increase in the current density necessary for the magnetization inversion of the first layer 21 does not occur.

As illustrated in FIGS. 8 and 9, the frequency band in the magnetization inversion process of the first layer 21 can be changed by adjusting the anisotropic magnetic field of the first layer 21.

Figure 10:
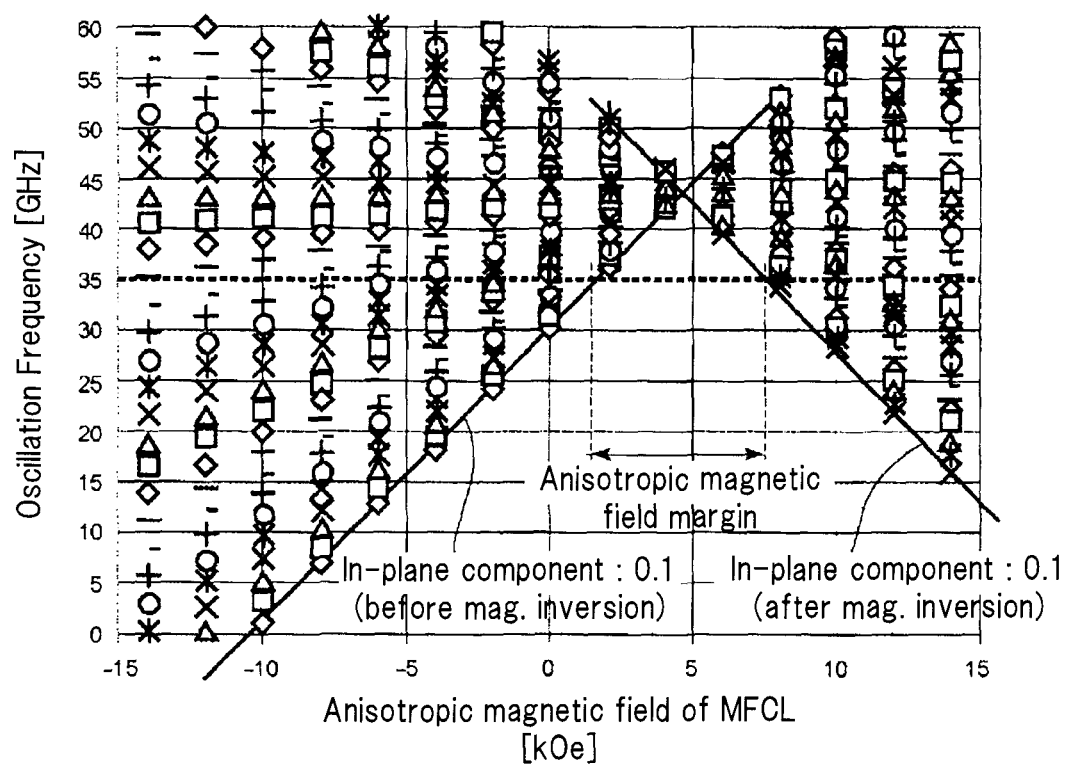
FIG. 10 is a diagram relating to control by an anisotropic magnetic field of an oscillation frequency in a magnetization inversion process of a magnetic flux control layer included in a magnetic recording apparatus according to an embodiment.
Figure 11:
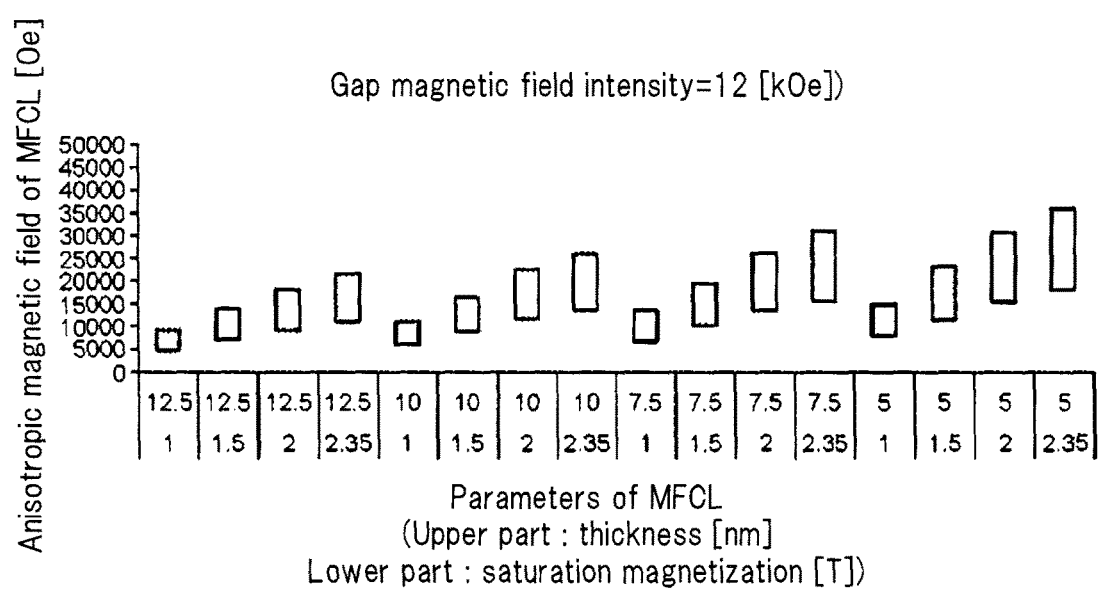
FIG. 11 is a diagram illustrating a relationship between a magnetic flux control layer's parameter and an anisotropic magnetic field margin when gap magnetic field intensity is 12 kOe in a magnetic recording apparatus according to an embodiment.
Figure 12:
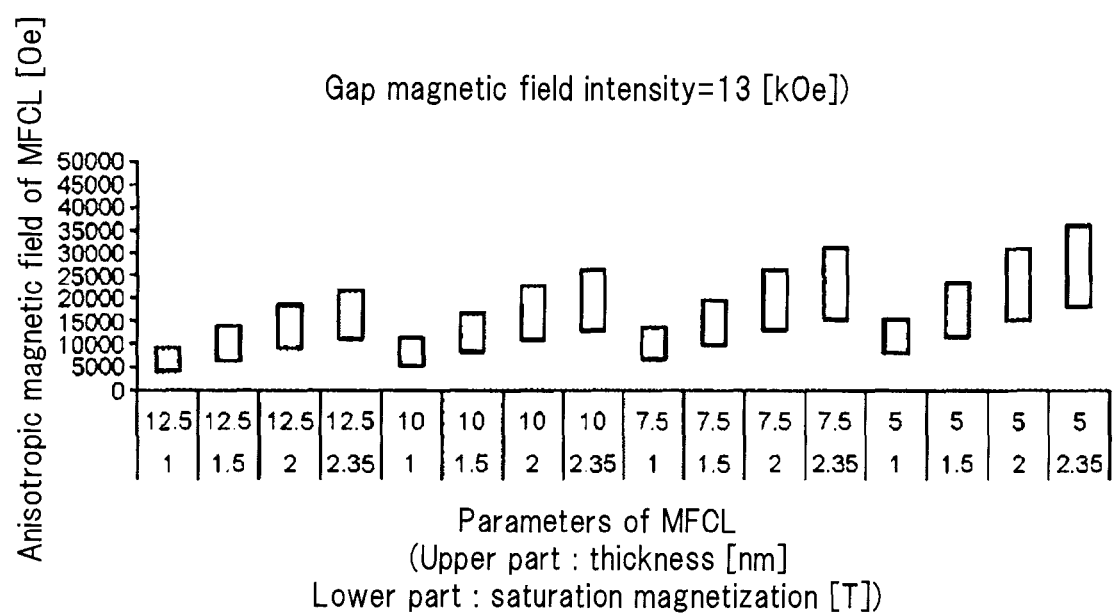
FIG. 12 is a diagram illustrating a relationship between a magnetic flux control layer's parameter and an anisotropic magnetic field margin when gap magnetic field intensity is 13 kOe in a magnetic recording apparatus according to an embodiment.
Figure 13:
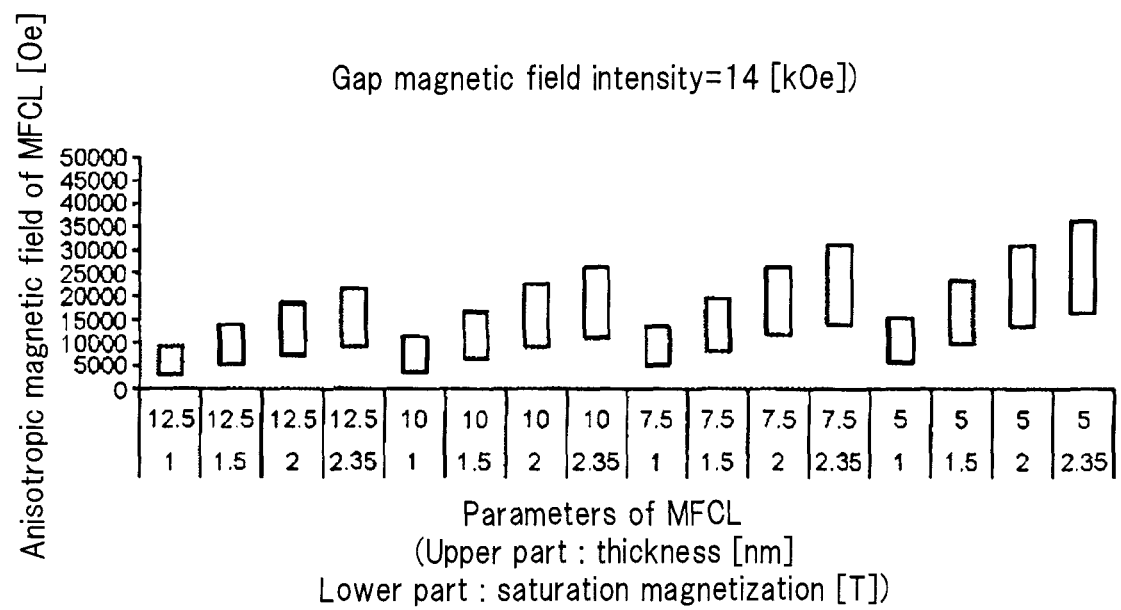
FIG. 13 is a diagram illustrating a relationship between a magnetic flux control layer's parameter and an anisotropic magnetic field margin when gap magnetic field intensity is 14 kOe in a magnetic recording apparatus according to an embodiment.
Figure 14:
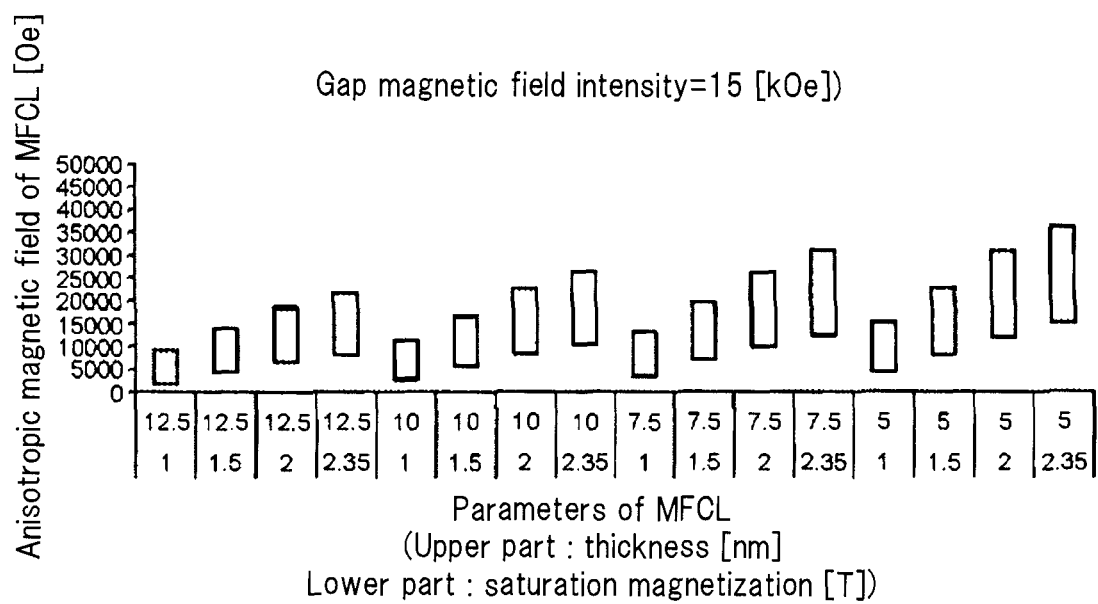
FIG. 14 is a diagram illustrating a relationship between a magnetic flux control layer's parameter and an anisotropic magnetic field margin when gap magnetic field intensity is 15 kOe in a magnetic recording apparatus according to an embodiment.
Figure 15:
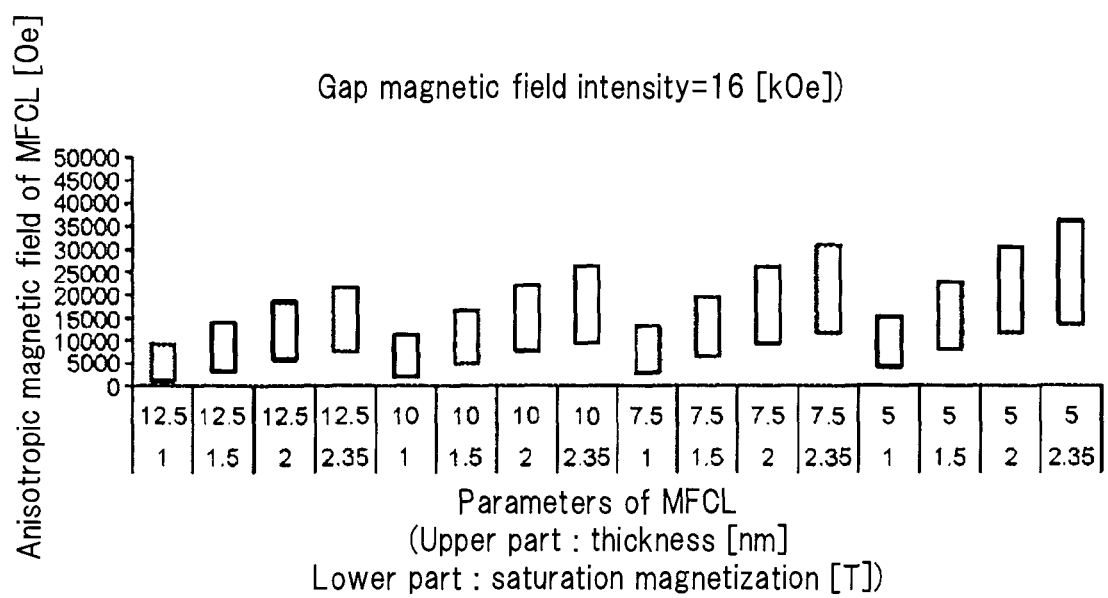
FIG. 15 is a diagram illustrating a relationship between a magnetic flux control layer's parameter and an anisotropic magnetic field margin when gap magnetic field intensity is 16 kOe in a magnetic recording apparatus according to an embodiment.
Figure 16:
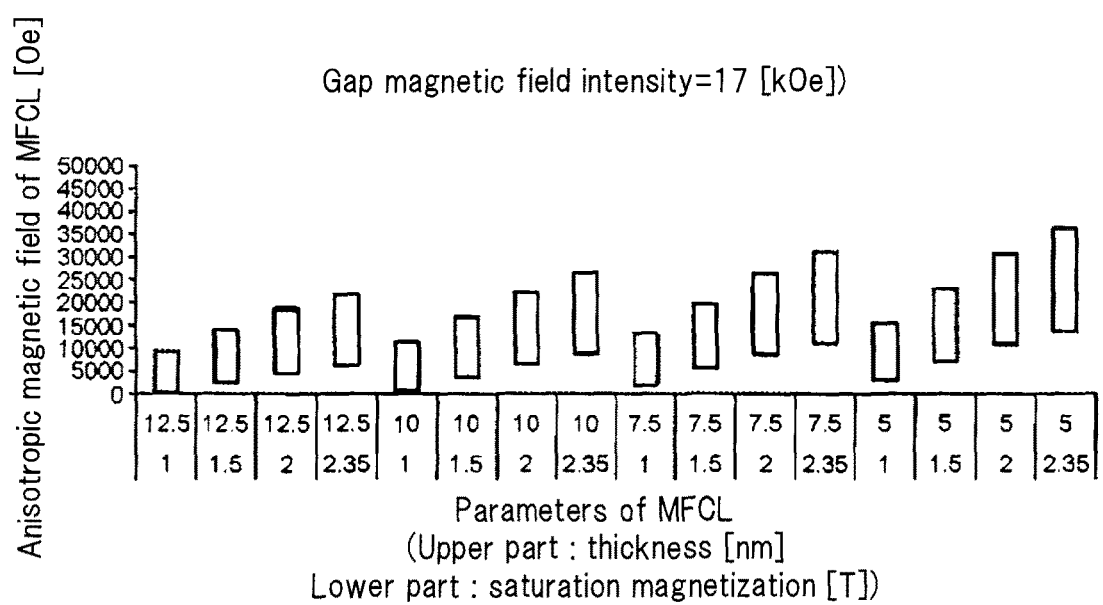
FIG. 16 is a diagram illustrating a relationship between a magnetic flux control layer's parameter and an anisotropic magnetic field margin when gap magnetic field intensity is 17 kOe in a magnetic recording apparatus according to an embodiment.
Figure 17:
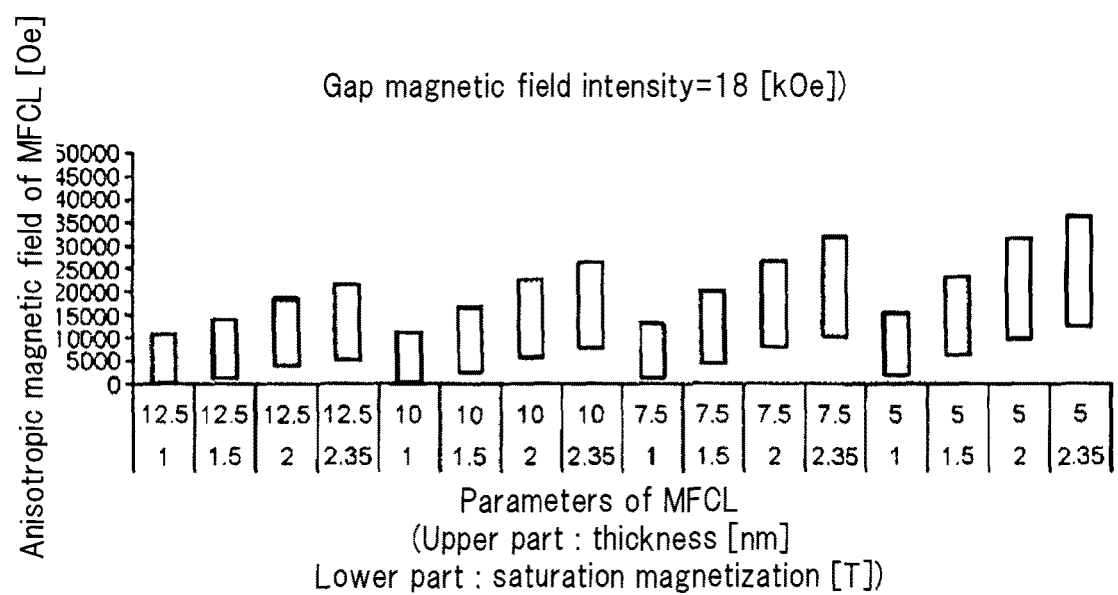
FIG. 17 is a diagram illustrating a relationship between a magnetic flux control layer's parameter and an anisotropic magnetic field margin when gap magnetic field intensity is 18 kOe in a magnetic recording apparatus according to an embodiment.

FIG. 10 is a diagram relating to control of oscillation frequency by an anisotropic magnetic field in a magnetization inversion process of a magnetic flux control layer included in a magnetic recording apparatus according to an embodiment. A vertical axis represents the oscillation frequency at each point in the magnetization inversion process of the first layer 21. A horizontal axis represents the anisotropic magnetic field of the first layer 21. The frequency of the magnetization of the first layer 21 in the magnetization inversion process is theoretically obtained from the Kittel's equation. In addition, in the magnetization state before and after the magnetization inversion, the magnetization inversion process is shown in a region where the in-plane component, which is thought to cause the magnetic coupling phenomenon remarkably, is greater than 0.1. That is, when a plot is present at a frequency below 35 GHz in this drawing, the magnetic coupling occurs in the magnetization inversion process of the first layer 21.

As illustrated in FIG. 10, it is possible to avoid the magnetic coupling region in the entire magnetization inversion process by setting the anisotropic magnetic field of the first layer 21 in a range of approximately 2 kOe to 8 kOe. In particular, when the anisotropic magnetic field is about 4.8 kOe, the frequency does not change over the entire magnetization inversion process. This is because the anisotropic magnetic field and a diamagnetic field are equal to each other in the first layer 21. A range of an anisotropic magnetic field which can avoid such a magnetic coupling region is defined as an anisotropic magnetic field margin.

Each of FIGS. 11, 12, 13, 14, 15, 16, and 17 is a diagram illustrating a relationship between the parameters of the first layer 21 and the anisotropic magnetic field margins when the gap magnetic field intensities are respectively 12 kOe, 13 kOe, 14 kOe, 15 kOe, 16 kOe, 17 kOe and 18 kOe. The write gap is changed in a range of 15 nm to 30 nm. A horizontal axis is the parameters of the first layer 21, wherein values of the upper part represents the film thicknesses and values of the lower part represents the saturation magnetizations. That is, several values of the parameters for the first layer 21 are examined. As a result, the anisotropic magnetic field margin in the parameters of each first layer 21 is represented by a bar graph.

As illustrated in FIGS. 11 to 17, the parameters of any of each first layer 21 have an anisotropic magnetic field margin. In addition, in either case, the anisotropic magnetic field margin exists in a region where the anisotropic magnetic field is zero or more.

FIG. 18A illustrates a relationship between a gap magnetic field intensity and a diamagnetic field of the first layer 21 of one threshold value (Hk1) of the anisotropic magnetic field margin which the frequency of the first layer 21 can exceed 35 GHz.

One threshold value (Hk1) of the anisotropic magnetic field margin is expressed by the following equation.

$$H_{k,1} = H_d - \left(\frac{35 \times 10^9/\gamma - H_{gap}}{sqrt(1-(0.1)^2)}\right) \approx H_d - \left(\frac{35 \times 10^9}{\gamma} - H_{gap}\right) \quad \text{[Math. 1]}$$

FIG. 18B shows a relationship between a gap magnetic field intensity of the other threshold value (Hk2) of the anisotropic magnetic field margin, which the frequency of the first layer 21 can exceed 35 GHz, and a diamagnetic field of the first layer 21.

The other threshold value (Hk2) of the anisotropic magnetic field margin Hk is expressed by the following equation.

$$H_{k,2} = H_d + \left(\frac{35 \times 10^9/\gamma - H_{gap}}{sqrt(1-(0.1)^2)}\right) \approx H_d + \left(\frac{35 \times 10^9}{\gamma} - H_{gap}\right) \quad \text{[Math. 2]}$$

Here, γ is a magnetic gyro constant, Hd is a diamagnetic field in the first layer 21, and Hgap is a gap magnetic field intensity.

That is, in the magnetic recording head 110 of the magnetic recording apparatus according to an embodiment, the anisotropic magnetic field margin in which no magnetic coupling occurs is present between Hk1 and Hk2 indicated by the above equation.

When these conditions are satisfied, the first layer 21 is not affected by the magnetic coupling. Therefore, efficient magnetization inversion can be performed. That is, it is possible to efficiently improve the record density in the magnetic flux control type magnetic recording apparatus.

Second Embodiment

Figure 19:
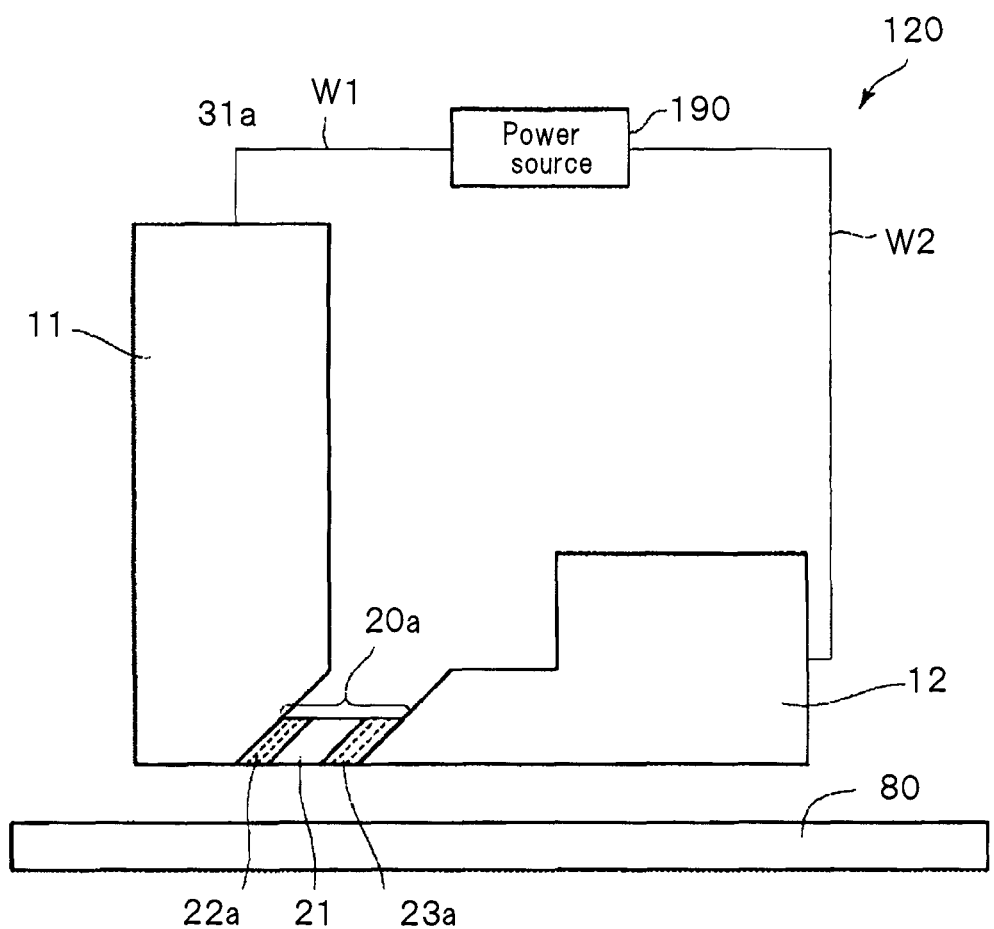
FIG. 19 is a diagram schematically illustrating a magnetic recording apparatus according to a second embodiment.

FIG. 19 is a diagram schematically illustrating a magnetic recording apparatus according to a second embodiment.

As illustrated in FIG. 19, a magnetic recording head 120 according to the second embodiment includes a magnetic flux control part 20a. Here, the magnetic flux control part 20a includes a first layer 21, a second layer 22a, and a third layer 23a.

The first layer 21 includes at least one first element selected from the group consisting of Fe, Co, and Ni. For example, the first layer 21 is FeCo.

The second layer 22a includes a metal. For example, the second layer 22a includes at least one element selected from the first group consisting of Cu, Ag, and Au. For example, the second layer 22a may further include at least one element selected from the second group including Pt, W, Ru, Ta, and Pd. For example, the second layer 22a may have a laminated structure including a portion including at least one element selected from the first group and a portion including at least one element selected from the second group. For example, the second layer 22a is a laminate of Cu and Ta. The second layer 22a is provided between the first layer 21 and a first magnetic pole part 11.

The third layer 23a includes a metal. For example, the third layer 23a includes at least one element selected from the first group consisting of Cu, Ag, and Au. For example, the third layer 23a may further include at least one element (material of the second group) selected from the second group including Pt, W, Ru, Ta, and Pd. For example, the third layer 23a may have a laminated structure including a portion including at least one element selected from the first group and a portion including at least one element selected from the second group. For example, the third layer 23a is a laminate of Cu and Ta. The third layer 23a is provided between the first layer 21 and a second magnetic pole part 12.

As illustrated in FIG. 19, for example, a first wiring W1 and a second wiring W2 are provided in the magnetic recording head 120 according to an embodiment. By connecting to a power source 190 via these wirings, a current can be supplied to a magnetic flux control part 20. In this example, the first wiring W1 is electrically connected to the first magnetic pole part 11. The second wiring W2 is electrically connected to the second magnetic pole part 12

For example, both the second layer 22a and the third layer 23a need not include the material of the second group, and either the second layer 22a or the third layer 23a may include the material of the second group. In addition, both the second layer 22a and the third layer 23a need not have the laminated structure, and either the second layer 22a or the third layer 23a may have the laminated structure.

In a case where the second layer 22a has the laminated structure, it is preferable that a portion including at least one element selected from the second group is provided, for example, in the vicinity of an interface between the second layer 22a and the first magnetic pole part 11, in the vicinity of an interface between the second layer 22a and the first layer 21, or in the vicinity of both interfaces.

In a case where the third layer 23a has the laminated structure, it is preferable that a portion including at least one element selected from the second group is provided, for example, in the vicinity of an interface with the first layer 21, in the vicinity of an interface between the third layer 23a and the second magnetic pole part 12, or in the vicinity of both interfaces.

By using such a configuration, it becomes possible to control the magnitude of the spin transfer torque (spin accumulation amount), and the current density at which the magnetization inversion of the first layer 21 becomes possible can be reduced.

Figure 20A:
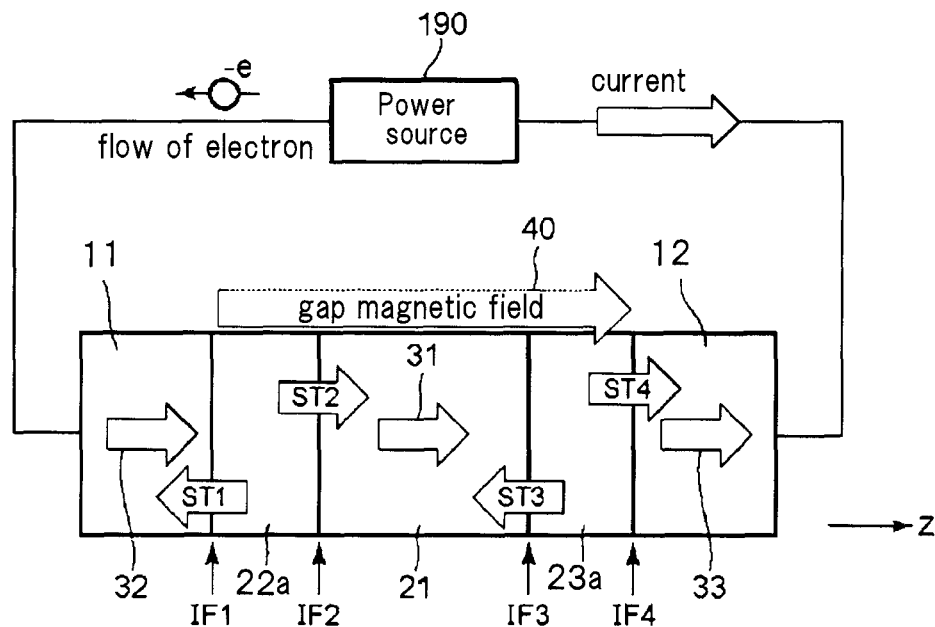
FIG. 20A and FIG. 20B are schematic diagrams illustrating states of magnetization and spin transfer torque in a magnetic recording head of a magnetic recording apparatus according to an embodiment.
Figure 20B:
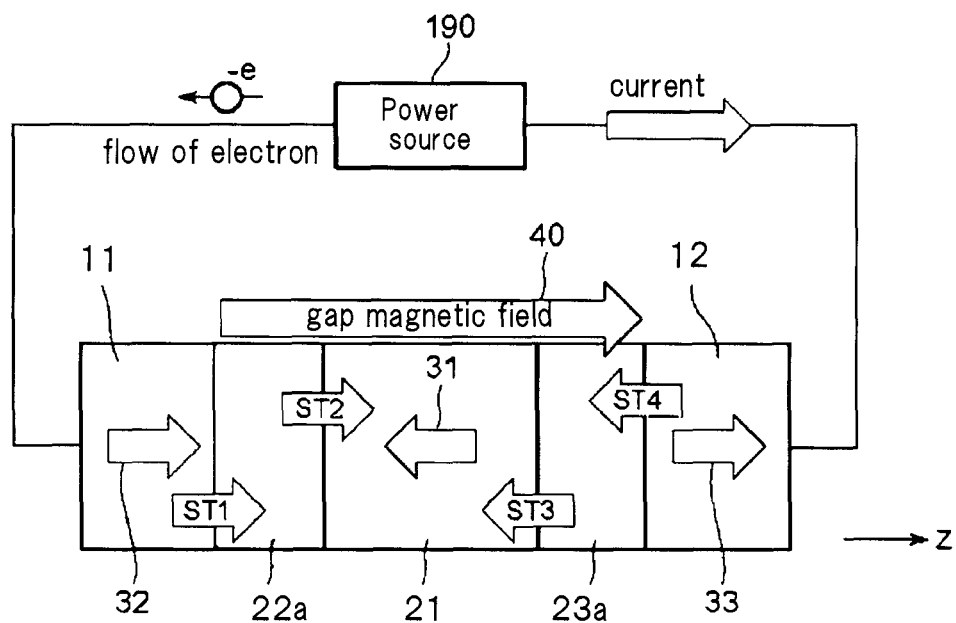

FIG. 20A and FIG. 20B are schematic diagrams illustrating states of magnetization and spin torque in the vicinity of the magnetic flux control part 20a of the magnetic recording head 120 of the magnetic recording apparatus according to an embodiment.

Here, the direction of the spin torque at each interface is briefly illustrated. A current flows from the second magnetic pole part 12 toward the first magnetic pole part 11. FIG. 20A is a schematic diagram schematically illustrating the direction of the spin torque before the magnetization inversion of the first layer 21. FIG. 20B is a schematic diagram schematically illustrating the direction of the spin torque after the magnetization inversion of the first layer 21.

Symbol IF1 represents the interface between the first magnetic pole part 11 and the second layer 22a. Symbol IF2 represents the interface between the second layer 22a and the first layer 21. Symbol IF3 represents the interface between the first layer 21 and the third layer 23a. Symbol IF4 represents the interface between the third layer 23a and the second magnetic pole part 12. The spin torque acts on the first magnetic pole part 11, the second magnetic pole part 12, and the first layer 21, which are made of a magnetic material, through each interface.

Symbol ST1 represents a reflection type spin transfer torque acting on, for example, the interface IF1 dependent on the magnetization direction of the first layer 21.

Symbol ST2 represents a transmission type spin transfer torque acting on, for example, the interface IF2 dependent on the magnetization direction of the first magnetic pole part 11.

Symbol ST3 represents a reflection type spin transfer torque acting on, for example, the interface IF3 dependent on the magnetization direction of the second magnetic pole part 12.

Symbol ST4 represents a transmission type spin transfer torque acting on, for example, the interface IF4 dependent on the magnetization direction of the first layer 21.

As illustrated in the drawing, the first layer 21 is affected by two spin transfer torques, for example, ST2 and ST3. As described in the first embodiment, the magnetization inversion of the first layer 21 occurs only when the spin torque in the direction opposite to the gap magnetic field 40 is greater than the spin torque in the same direction as the gap magnetic field 40.

In this example, it is considered that the first layer 21 becomes magnetizable and reversible at least under the condition of ST2<ST3. That is, when ST3 is finite, it is considered that the first layer 21 can easily invert the magnetization by suppressing ST2.

In order to suppress the spin transfer torque, it is effective to include elements of the second group such as Pt, W, Ta, Ru, Pd, or the like in the magnetic flux control part 20a. For example, it is considered to include at least one element selected from the second group in the second layer 22a or the third layer 23a.

In addition, it is considered that the spin transfer torque can be selectively suppressed by providing a portion including at least one element selected from the second group in the vicinity of the interface.

Figure 21:
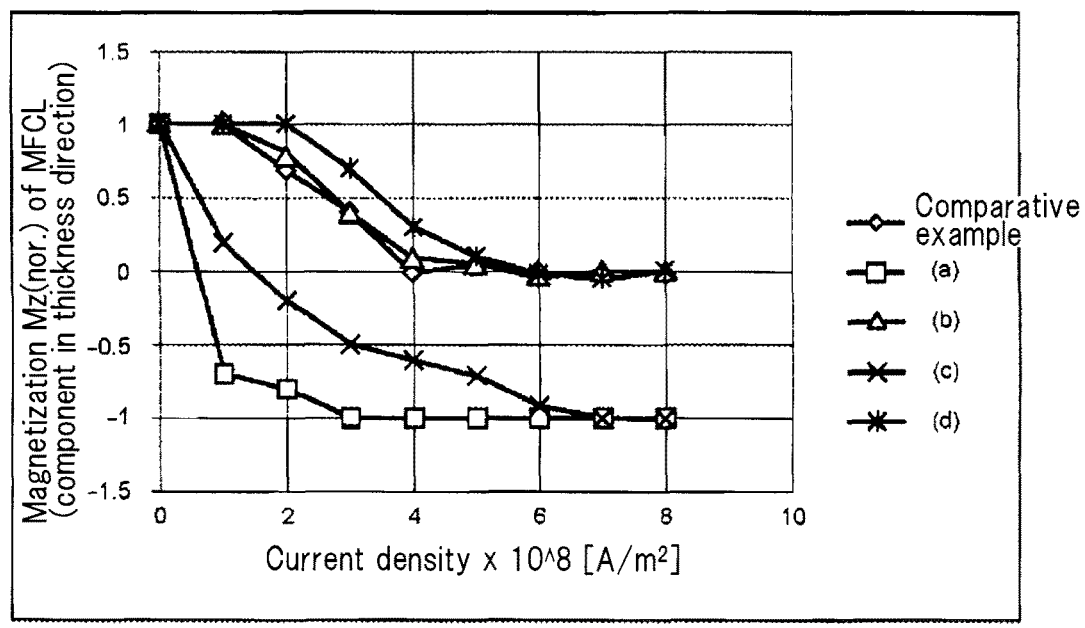
FIG. 21 is a diagram illustrating characteristics of a magnetic recording head of a magnetic recording apparatus according to an embodiment.

FIG. 21 is a diagram illustrating characteristics of the magnetic recording head 120 of the magnetic recording apparatus according to the embodiment.

A horizontal axis represents a current density of a current which flows from the second magnetic pole part 12 to the first magnetic pole part 11. A vertical axis represents a component of the normalized magnetization in a thickness direction of the first layer 21 as the magnetic flux control layer.

In the magnetic recording head according to an embodiment, the structure of the model is as follows.

The second layer 22a or the third layer 23a is a laminate of Cu and Ta in which 2-nm Ta is laminated in the vicinity of the interface between IF1 and IF4. A film thickness of each of the second layer 22a and the third layer 23a is 4 nm, and a portion excluding Ta is made of Cu having a long spin diffusion length. In addition, here, the first magnetic pole part 11, the second magnetic pole part 12, and the first layer 21 all have a spin polarizability of 0.5. The other configurations are the same as those illustrated in the first embodiment. By laminating Ta, the magnitude of effective spin polarizability changes. The gap magnetic field intensity is 15 kOe. The current is supplied in a direction from the second magnetic pole part 12 toward the first magnetic pole part 11.

In a comparative example, the second layer 22a and the third layer 23a do not include Ta. That is, the second layer 22a and the third layer 23a include only Cu, and a spin torque corresponding to the spin polarizability of 0.5 is generated at all interfaces.

In a case where the second layer 22a is, for example, a Ta/Cu laminate in which Ta is laminated in the vicinity of the IF1, ST2 can be suppressed. ST2 acts to inhibit magnetization inversion and maintenance of magnetization inversion state of the first layer 21 before and after the magnetization inversion of the first layer 21. Therefore, as shown by (a) in FIG. 21, the magnetization inversion efficiency is improved by suppressing ST2.

In a case where the second layer 22a is, for example, a Cu/Ta laminate in which Ta is laminated in the vicinity of the IF2, ST1 can be suppressed. ST1 acts to unstabilize or stabilize the first magnetic pole part magnetization 32 before and after the magnetization inversion of the first layer 21.

For example, the first magnetic pole part magnetization 32 is stabilized before the magnetization inversion of the first layer 21 by the Cu/Ta laminate, and thus, ST2 works effectively. However, ST2 does not contribute to the magnetization inversion of the first layer 21. Therefore, as shown by (b) in FIG. 21, the magnetization inversion efficiency is not greatly changed by suppressing ST1.

In a case where the third layer 23a is, for example, a Ta/Cu laminate in which Ta is laminated in the vicinity of the IF3, ST4 can be suppressed. ST4 acts to unstabilize or stabilize the second magnetic pole part magnetization 33 before and after the magnetization inversion of the first layer 21. For example, the second magnetic pole part magnetization 33 is stabilized after the magnetization inversion by the Cu/Ta laminate, and thus, ST3 works effectively. ST3 contributes to the inversion of the first layer 21. Therefore, as shown by (c) in FIG. 21, the magnetization inversion efficiency is improved by suppressing ST4.

In a case where the third layer 23a is, for example, a Cu/Ta laminate in which Ta is laminated in the vicinity of the IF4, ST3 can be suppressed. In the magnetic recording head 120 according to an embodiment, ST3 acts to promote the magnetization inversion of the first layer 21 and the maintenance of the magnetization inversion state before and after the magnetization inversion of the first layer 21. Therefore, as shown by (d) in FIG. 21, the magnetization inversion efficiency is deteriorated by suppressing ST4.

It can be expected that these effects can occur complexly. For example, in a case where the second layer 22a is, for example, a Ta/Cu laminate in which Ta is laminated in the vicinity of the IF1 and the third layer 23a is, for example, a Ta/Cu laminate in which Ta is laminated in the vicinity of the IF3, it is considered that the inversion efficiency is further improved by suppressing ST2 and ST4.

As described above, in the magnetic recording head 120 according to an embodiment, Pt, W, Ta, Ru, Pd, or the like may be included in either or both of the second layer 22a and the third layer 23a. Therefore, the magnitude of the spin transfer torque acting on the first magnetic pole part 11, the second magnetic pole part 12, and the first layer 21 is controlled. Therefore, the magnetization inversion efficiency of the first layer 21 can be increased.

In this embodiment, as the second layer 22a and the third layer 23a, a Ta/Cu laminate including Ta with a thickness of 2 nm is shown as an example. However, for example, a case including at least one element selected from the second group can also expect the same effect. For example, as in the embodiment, in the case of using a laminate having a portion including at least one element selected from the second group in the second layer 22a, a thickness of the portion including at least one element selected from the second group is preferably 0.5 nm or more and 5.0 nm or less. The same also applies to the third layer 23a. A film thickness necessary for completely suppressing the spin transfer torque changes according to the element selected from the second group. For example, in the case of Ta, the film thickness is about 2 nm. In addition, it is considered that as the film thickness is smaller, the effect of suppressing the spin transfer torque becomes smaller.

Figure 22A:
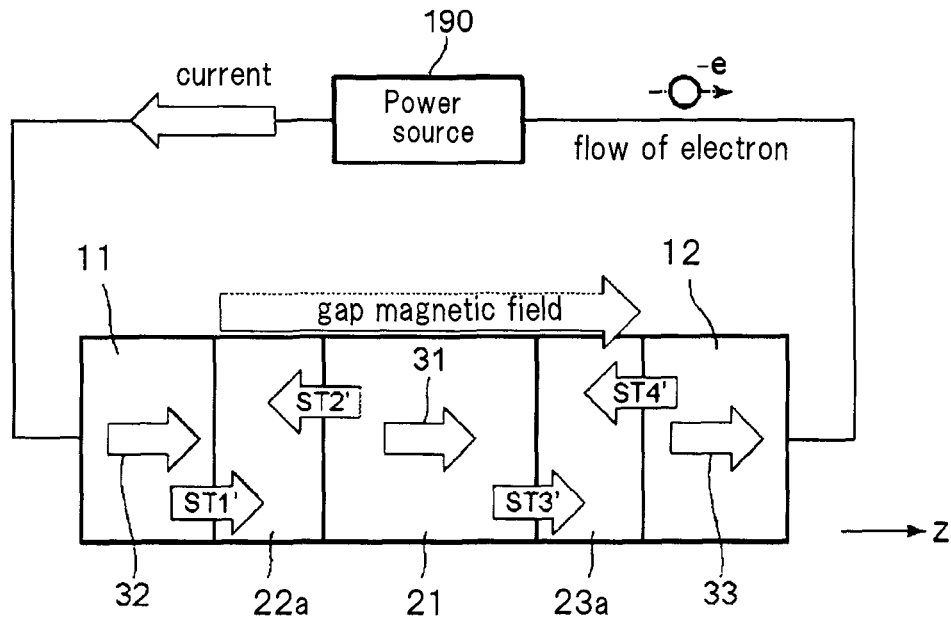
FIG. 22A and FIG. 22B are schematic diagrams illustrating states of magnetization and spin transfer torque in a magnetic recording head of a magnetic recording apparatus according to an embodiment.
Figure 22B:
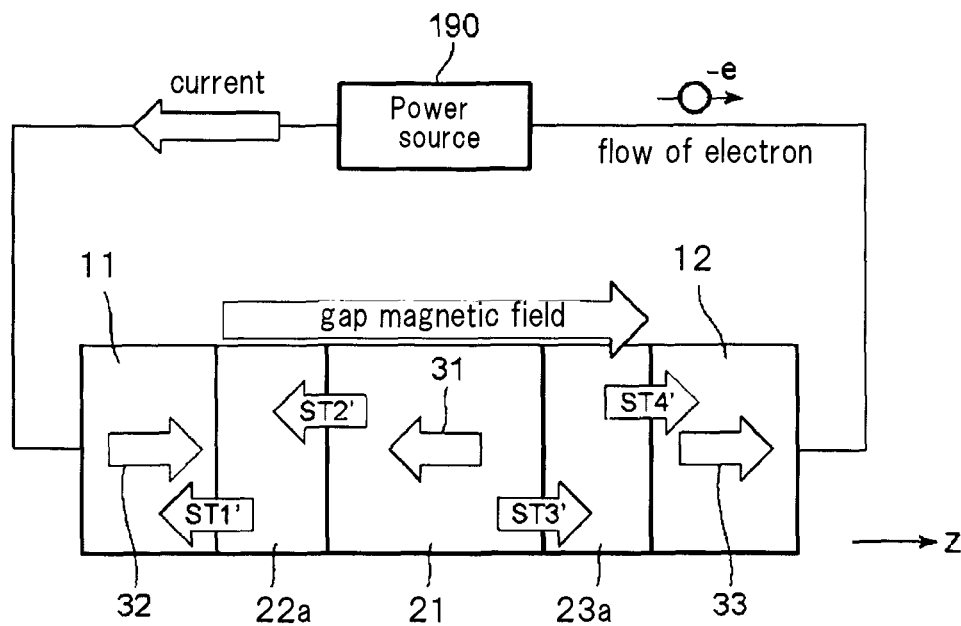

FIG. 22A and FIG. 22B are schematic diagrams illustrating states of the magnetization and the spin transfer torque in the magnetic recording head of the magnetic recording apparatus according to an embodiment.

Here, the direction of the spin torque at each interface is briefly illustrated. A current flows from the first magnetic pole part 11 toward the second magnetic pole part 12. FIG. 22A is a schematic diagram schematically illustrating the direction of the spin torque before the magnetization inversion of the first layer 21. FIG. 22B is a schematic diagram schematically illustrating the direction of the spin torque after the magnetization inversion of the first layer 21.

As illustrated in FIG. 22A and FIG. 22B, for example, as a current direction changes, the relationship of the acting spin transfer torque changes.

Symbol ST1' represents a transmission type spin transfer torque acting on, for example, the interface IF1 dependent on the magnetization direction of the first layer 21.

Symbol ST2' represents a reflection type spin transfer torque acting on, for example, the interface IF2 dependent on the magnetization direction of the first magnetic pole part 11.

Symbol ST3' represents a transmission type spin transfer torque acting on, for example, the interface IF3 dependent on the magnetization direction of the second magnetic pole part 12.

Symbol ST4' represents a reflection type spin transfer torque acting on, for example, the interface IF4 dependent on the magnetization direction of the first layer 21.

Based on the above idea, in this case, it is considered that efficient magnetization inversion of the magnetization of the first layer 21 can be achieved by suppressing ST3' or ST1'.

In a case where the gap magnetic field is inverted depending on the polarity of the recording current, the magnetization direction of each layer is inverted. Along with this, since the direction of the spin transfer torque is also inverted, the relationship between the magnetization and the spin transfer torque does not change. Therefore, a direct current in one direction can be energized to the magnetic flux control part 20a without depending on the polarity of the recording current.

In the magnetic recording head 120 according to an embodiment, it is possible to efficiently reverse the magnetization direction of the first layer 21 by appropriately suppressing the spin transfer torque. As a result, high density magnetic recording can be easily achieved.

Figure 23:
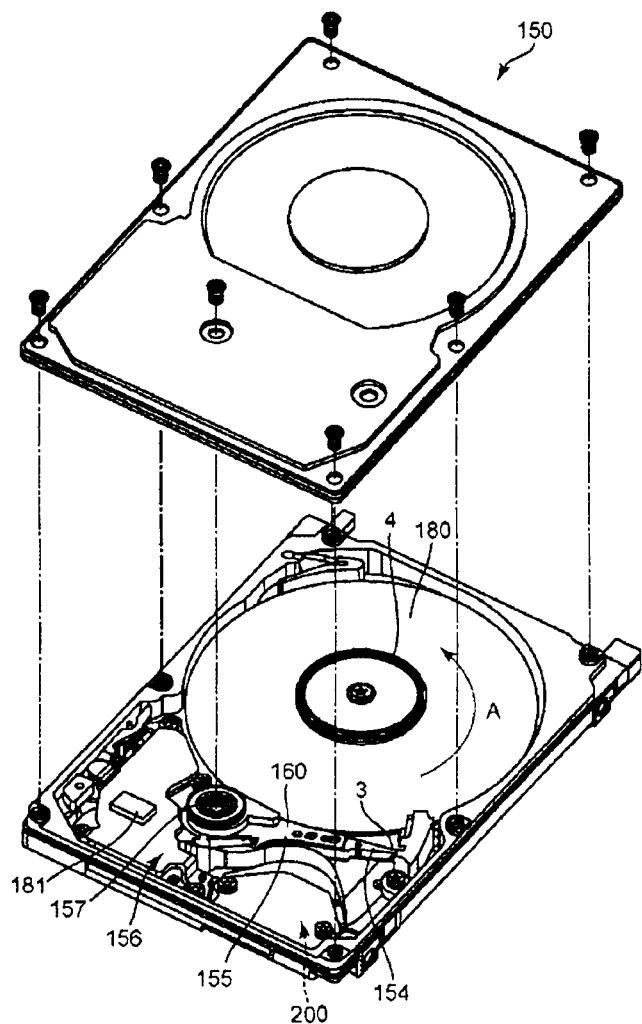
FIG. 23 is a schematic perspective view illustrating a magnetic recording apparatus according to an embodiment.

FIG. 23 is a schematic perspective view illustrating a magnetic recording apparatus according to an embodiment.

As illustrated in FIG. 23, a magnetic recording apparatus 150 according to an embodiment is an apparatus of a type using a rotary actuator. A magnetic recording medium (magnetic recording disk) 180 is mounted on a spindle motor 4 and is rotated in a direction of an arrow A by a motor responding to a control signal from a driver control unit. The magnetic recording apparatus 150 according to the present embodiment may include a plurality of magnetic recording media 180. The magnetic recording apparatus 150 may include another recording medium 181. For example, the magnetic recording apparatus 150 is a hybrid Hard Disk Drive (HDD). The recording medium 181 is, for example, a Solid State Drive (SSD). In the recording medium 181, for example, a nonvolatile memory such as a flash memory is used.

For example, the magnetic recording head 110 is provided near the tip of a head slider 3, and records information to be recorded on the magnetic recording medium 180. The head slider 3 is attached to, for example, the tip of a suspension 154 having a thin film shape.

When the magnetic recording medium 180 rotates, the pressing pressure by the suspension 154 and the pressure generated at a medium facing surface (ABS) of the head slider 3 are balanced, and the medium facing surface of the head slider 3 is held with a predetermined flying height from the surface of the magnetic recording medium 180. A so-called "contact running type" in which the head slider 3 contacts the magnetic recording medium 180 may be used.

The suspension 154 is connected to one end of an arm 155 (for example, an actuator arm). The arm 155 has, for example, a bobbin part for holding a driving coil. A voice coil motor 156, which is a type of a linear motor, is provided at the other end of the arm 155. The voice coil motor 156 may include a driving coil wound around the bobbin part of the arm 155, and a magnetic circuit including a permanent magnet and an opposing yoke disposed to sandwich the coil therebetween. The suspension 154 has one end and the other end, the magnetic recording head is mounted on one end of the suspension 154, and the arm 155 is connected to the other end of the suspension 154.

The arm 155 is held by ball bearings provided at two upper and lower portions of a bearing part 157, and is freely rotatable by the voice coil motor 156. As a result, the magnetic recording head 110 can be moved to an arbitrary position of the magnetic recording medium 180.

Figure 24A:
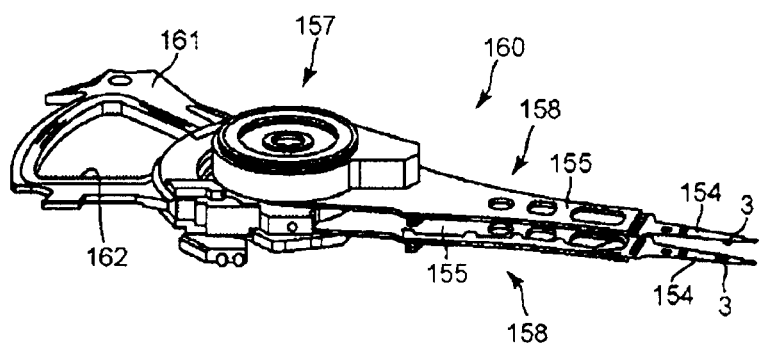
FIG. 24A and FIG. 24B are schematic perspective views illustrating portions of a magnetic recording apparatus according to an embodiment.
Figure 24B:
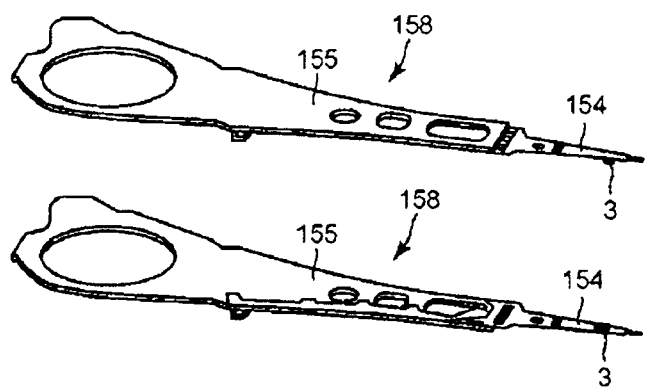

FIG. 24A and FIG. 24B are schematic perspective views illustrating portions of the magnetic recording apparatus according to an embodiment.

FIG. 24A illustrates a configuration of a portion of the magnetic recording apparatus and is an enlarged perspective view of a head stack assembly 160.

In addition, FIG. 24B is a perspective view illustrating a magnetic head assembly (head gimbal assembly: HGA) 158 which is a portion of the head stack assembly 160.

As illustrated in FIG. 24A, the head stack assembly 160 includes a bearing part 157, a head gimbal assembly 158, and a support frame 161. The head gimbal assembly 158 extends from the bearing part 157. The support frame 161 extends from the bearing part 157 in a direction opposite to the HGA. The support frame 161 supports a coil 162 of the voice coil motor.

In addition, as illustrated in FIG. 24B, the head gimbal assembly 158 includes an arm 155 extending from the bearing part 157 and a suspension 154 extending from the arm 155.

A head slider 3 is attached to the tip of the suspension 154. Magnetic recording heads 110 and 120 according to an embodiment are mounted on the head slider 3.

That is, the magnetic head assembly (head gimbal assembly) 158 according to an embodiment includes the magnetic recording heads 110 and 120 according to an embodiment, the head slider 3 on which the magnetic recording heads 110 and 120 are mounted, the suspension 154 which mounts the head slider 3 at one end, and the arm 155 connected to the other end of the suspension 154.

The suspension 154 may have lead wires (not illustrated) for recording and reproducing signals, for heaters for adjusting the flying height, and for spin torque oscillators, for example. These lead wires are electrically connected to the respective electrodes of the magnetic recording heads 110 and 120 incorporated in the head slider 3.

In addition, a signal processing unit 200 is provided to record signals on the magnetic recording medium 80 by using the magnetic recording heads 110 and 120. The signal processing unit 200 is provided in, for example, a portion of the magnetic recording apparatus 150 (see FIG. 23). Input/output lines of the signal processing unit 200 are connected to electrode pads of the head gimbal assembly 158 and are electrically coupled to the magnetic recording heads 110 and 120.

As described above, the magnetic recording apparatus 150 according to the present embodiment includes the magnetic recording medium 80, the magnetic recording heads 110 and 120 according to the above-described embodiments, a movable part which is relatively movable with the magnetic recording medium 80 and the magnetic recording heads 110 and 120 in a separated or contacted state, a position control part for positioning the magnetic recording heads 110 and 120 at predetermined recording positions of the magnetic recording medium 80, and the signal processing unit 200 for recording and reproducing signals on the magnetic recording medium 80 by using the magnetic recording heads 110 and 120.

That is, the magnetic recording medium 180 is used as the magnetic recording medium 80. The movable part may include the head slider 3. In addition, the position control part may include the head gimbal assembly 158.

The magnetic recording apparatus 150 according to this embodiment includes: a magnetic recording medium 80; a magnetic recording head 110, which is capable of recording magnetic data on the magnetic recording medium, the magnetic recording head 110 including a first magnetic pole part 11, a second magnetic pole part 12, a first layer 21 provided between the first magnetic pole part 11 and the second magnetic pole part 12 and including a ferromagnetic material, a second layer 22 provided between the first magnetic pole part 11 and the first layer 21 and including a metal, and a third layer 23 provided between the second magnetic pole part 12 and the first layer 21 and including a metal; and a power source 190 connected to the first magnetic pole part 11 and the second magnetic pole part 12 and capable of applying a current, wherein an oscillation frequency of magnetization of the first layer 21 is greater than a ferromagnetic resonance frequency of the magnetic recording medium.

In addition, it is desirable that the current applied to the first layer 21 is a direct current.

Furthermore, it is desirable that the value of the anisotropic magnetic field of the first layer 21 is in the range surrounded by the first value (Hk1) and the second value (Hk2) shown in the above equation.

The embodiment may include, for example, the following configurations.

(Configuration 1)
A magnetic recording apparatus including:
a magnetic recording medium;
a magnetic recording head, which is capable of recording data on the magnetic recording medium, the magnetic recording head including:
a first magnetic pole part;
a second magnetic pole part; and
a magnetic flux control part provided between the first magnetic pole part and the second magnetic pole part,
wherein the magnetic flux control part includes:
a first layer provided between the first magnetic pole part and the second magnetic pole part and including at least one element selected from the group consisting of Fe, Co, and Ni;
a second layer provided between the first magnetic pole part and the first layer and including at least one element selected from the group consisting of Cu, Ag, and Au; and
a third layer provided between the second magnetic pole part and the first layer and including at least one element selected from the group consisting of Cu, Ag, and Au;
an electrode for applying a current to the magnetic flux control part; and
an electric circuit for energizing the current to the electrode,
wherein an oscillation frequency of magnetization of the first layer is greater than a ferromagnetic resonance frequency of the magnetic recording medium.

(Configuration 2)
The magnetic recording apparatus according to Configuration 1, wherein an anisotropic magnetic field of the first layer is positive.

(Configuration 3)
The magnetic recording apparatus according to Configurations 1 and 2, wherein the current energized to the first layer is a direct current.

(Configuration 4)
The magnetic recording apparatus according to Configurations 1 to 3, wherein a film thickness of the first layer is thicker than a film thickness of the second layer and the third layer.

(Configuration 5)
The magnetic recording apparatus according to any one of Configurations 1 to 4, wherein a value of the anisotropic magnetic field of the first layer is in a range surrounded by a first value (Hk1) and a second value (Hk2) shown by the following Equation:

$$H_{k,1} = H_d - \left( \frac{35 \times 10^9}{\gamma} - H_{gap} \right) \quad [\text{Math. 3}]$$

$$H_{k,2} = H_d + \left( \frac{35 \times 10^9}{\gamma} - H_{gap} \right)$$

(Configuration 6)
A magnetic recording head, which is capable of recording data on a magnetic recording medium, the magnetic recording head including:
a first magnetic pole part;
a second magnetic pole part; and
a magnetic flux control part provided between the first magnetic pole part and the second magnetic pole part,
wherein the magnetic flux control part includes:
a first layer provided between the first magnetic pole part and the second magnetic pole part and including at least one element selected from the group consisting of Fe, Co, and Ni;
a second layer provided between the first magnetic pole part and the first layer and including at least one element selected from Pt, W, Ta, Ru, and Pd; and
a third layer provided between the second magnetic pole part and the first layer and including at least one element selected from the group consisting of Cu, Ag, and Au.

(Configuration 7)
The magnetic recording head according to Configuration 6, wherein the second layer further includes at least one element selected from the group consisting of Cu, Ag, and Au.

(Configuration 8)
The magnetic recording head according to Configuration 6 or 7, wherein the second layer is constituted by a laminate having a portion including at least one element selected from Pt, W, Ta, Ru, and Pd and a portion including at least one element selected from the group consisting of Cu, Ag, and Au.

(Configuration 9)
The magnetic recording head according to Configurations 6 to 8, wherein the second layer is a laminate having a portion including at least one element selected from Pt, W, Ta, Ru, and Pd in the vicinity of a surface contacting the first magnetic pole part.

(Configuration 10)

The magnetic recording head according to Configurations 6 to 8, wherein the second layer is a laminate having a portion including at least one element selected from Pt, W, Ta, Ru, and Pd in the vicinity of a surface contacting the first layer.

(Configuration 11)

The magnetic recording head according to Configurations 6 to 8, wherein the second layer is a laminate having a portion including at least one element selected from Pt, W, Ta, Ru, and Pd in the vicinity of a surface contacting the first magnetic pole part and a surface contacting the first layer.

(Configuration 12)

A magnetic recording head, which is capable of recording data on the magnetic recording medium, the magnetic recording head including:
 a first magnetic pole part;
 a second magnetic pole part; and
 a magnetic flux control part provided between the first magnetic pole part and the second magnetic pole part,
  wherein the magnetic flux control part includes:
  a first layer provided between the first magnetic pole part and the second magnetic pole part and including at least one element selected from the group consisting of Fe, Co, and Ni;
  a second layer provided between the first magnetic pole part and the first layer and including at least one element selected from the group consisting of Cu, Ag, and Au; and
  a third layer provided between the second magnetic pole part and the first layer and including at least one element selected from Pt, W, Ta, Ru, and Pd.

(Configuration 13)

The magnetic recording head according to Configuration 12, wherein the third layer further includes at least one element selected from the group consisting of Cu, Ag, and Au.

(Configuration 14)

The magnetic recording head according to Configurations 12 and 13, wherein the third layer is constituted by a laminate having a portion including at least one element selected from Pt, W, Ta, Ru, and Pd and a portion including at least one element selected from the group consisting of Cu, Ag, and Au.

(Configuration 15)

The magnetic recording head according to Configurations 12 to 14, wherein the third layer is a laminate having a portion including at least one element selected from Pt, W, Ta, Ru, and Pd in the vicinity of a surface contacting the first layer.

(Configuration 16)

The magnetic recording head according to Configurations 12 to 14, wherein the third layer is a laminate having a portion including at least one element selected from Pt, W, Ta, Ru, and Pd in the vicinity of a surface contacting the second magnetic pole part.

(Configuration 17)

The magnetic recording head according to Configurations 12 to 14, wherein the third layer is a laminate having a portion including at least one element selected from Pt, W, Ta, Ru, and Pd in the vicinity of a surface contacting the second magnetic pole part and a surface contacting the first layer.

(Configuration 18)

A magnetic recording head, which is capable of recording data on the magnetic recording medium, the magnetic recording head including:
 a first magnetic pole part;
 a second magnetic pole part; and
 a magnetic flux control part provided between the first magnetic pole part and the second magnetic pole part,
  wherein the magnetic flux control part includes:
  a first layer provided between the first magnetic pole part and the second magnetic pole part and including at least one element selected from the group consisting of Fe, Co, and Ni;
  a second layer provided between the first magnetic pole part and the first layer and including at least one element selected from Pt, W, Ta, Ru, and Pd; and
  a third layer provided between the second magnetic pole part and the first layer and including at least one element selected from Pt, W, Ta, Ru, and Pd.

(Configuration 19)

The magnetic recording head according to Configuration 18, wherein the second layer and the third layer further include at least one element selected from the group consisting of Cu, Ag, and Au.

(Configuration 20)

The magnetic recording head according to Configurations 18 and 19, wherein the second layer is constituted by a laminate having a portion including at least one element selected from Pt, W, Ta, Ru, and Pd and a portion including at least one element selected from the group consisting of Cu, Ag, and Au.

(Configuration 21)

The magnetic recording head according to Configurations 18 to 20, wherein the second layer is a laminate having a portion including at least one element selected from Pt, W, Ta, Ru, and Pd in the vicinity of a surface contacting the first magnetic pole part.

(Configuration 22)

The magnetic recording head according to Configurations 18 to 20, wherein the second layer is a laminate having a portion including at least one element selected from Pt, W, Ta, Ru, and Pd in the vicinity of a surface contacting the first layer.

(Configuration 23)

The magnetic recording head according to Configurations 18 to 20, wherein the second layer is a laminate having a portion including at least one element selected from Pt, W, Ta, Ru, and Pd in the vicinity of a surface contacting the first magnetic pole part and a surface contacting the first layer.

(Configuration 24)

The magnetic recording head according to Configurations 18 to 23, wherein the third layer is constituted by a laminate having a portion including at least one element selected from Pt, W, Ta, Ru, and Pd and a portion including at least one element selected from the group consisting of Cu, Ag, and Au.

(Configuration 25)

The magnetic recording head according to Configurations 18 to 24, wherein the third layer is a laminate having a portion including at least one element selected from Pt, W, Ta, Ru, and Pd in the vicinity of a surface contacting the first layer.

(Configuration 26)

The magnetic recording head according to Configurations 18 to 24, wherein the third layer is a laminate having a portion including at least one element selected from Pt, W, Ta, Ru, and Pd in the vicinity of a surface contacting the second magnetic pole part.

(Configuration 27)

The magnetic recording head according to Configurations 18 to 24, wherein the third layer is a laminate having a portion including at least one element selected from Pt, W, Ta, Ru, and Pd in the vicinity of a surface contacting the second magnetic pole part and a surface contacting the first layer.

(Configuration 28)

A magnetic recording apparatus including:

a magnetic recording head according to any one of Configurations 6 to 27;

a magnetic recording medium on which information is recorded by the magnetic recording head; and a first electric circuit, which is capable of supplying a current to the magnetic flux control part of the magnetic recording head.

(Configuration 29)

The magnetic recording apparatus according to Configuration 28, further including a second electric circuit, wherein the magnetic recording head further includes a coil, and the second electric circuit is capable of supplying a current corresponding to the information to the coil.

For example, in the magnetic recording head 120 and the magnetic recording apparatus 150 according to the embodiment provided in Configuration 6 and subsequent Configurations, the magnetization inversion of the first layer 21 can be efficiently caused.

The embodiments of the present invention have been described with reference to specific examples. However, the embodiments of the present invention are not limited to these specific examples. For example, with regard to the specific configuration of each element of the magnetic recording medium, the magnetic recording head, and the recording current output part, those skilled in the art can appropriately select from the known range. In addition, as long as the present invention is carried out in the same way and the same effect can be obtained, it falls within the scope of the present invention.

In addition, combinations of any two or more elements of each specific example in a technically available range also falls within the scope of the present invention as long as the combinations are included in the gist of the present invention.

In addition, any magnetic recording apparatuses which can be implemented by appropriately design modification by those skilled in the art based on the magnetic recording apparatus described above as the embodiment of the present invention can fall within the scope of the present invention, as long as these magnetic recording apparatuses are included in the gist of the present invention.

In addition, various modifications and changes can be made without departing from the spirit of the present invention by those skilled in the art, and it is understood that these modifications and changes also fall within the scope of the present invention.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. These embodiments and modifications fall within in the scope and gist of the invention and are included in the equivalent scope to the invention described in the claims.

What is claimed is:

1. A magnetic recording apparatus comprising:
a magnetic recording medium;
a magnetic recording head, which is capable of recording data on the magnetic recording medium, the magnetic recording head including:
a first magnetic pole part;
a second magnetic pole part; and
a magnetic flux control part provided between the first magnetic pole part and the second magnetic pole part,
wherein the magnetic flux control part comprises:
a first layer being provided as a magnetic flux control layer between the first magnetic pole part and the second magnetic pole part and including at least one element selected from the group consisting of Fe, Co, and Ni;
a second layer provided between the first magnetic pole part and the first layer and including at least one element selected from the group consisting of Cu, Ag, and Au; and
a third layer provided between the second magnetic pole part and the first layer and including at least one element selected from the group consisting of Cu, Ag, and Au;
an electrode for applying a current to the magnetic flux control part; and
an electric circuit for energizing the current to the electrode and causing a gap magnetic field between the first magnetic pole part and the second magnetic pole part,
wherein an oscillation frequency of magnetization of the first layer for recording is greater than a ferromagnetic resonance frequency of the magnetic recording medium while the first layer has a component antiparallel to the gap magnetic field after a magnetization direction of the first layer is inverted.

2. The magnetic recording apparatus according to claim 1, wherein an anisotropic magnetic field of the first layer is positive.

3. The magnetic recording apparatus according to claim 1 or 2, wherein the current energized to the first layer is a direct current.

4. The magnetic recording apparatus according to claim 1, wherein a film thickness of the first layer is thicker than a film thickness of the second layer and the third layer.

5. The magnetic recording apparatus according to claim 1, wherein a value of the anisotropic magnetic field of the first layer is in a range surrounded by a first value (Hk1) and a second value (Hk2) shown by the following Equation:

$$H_{k,1} = H_d - \left(\frac{35 \times 10^9/\gamma - H_{gap}}{sqrt(1-(0.1)^2)}\right) \approx H_d - \left(\frac{35 \times 10^9}{\gamma} - H_{gap}\right). \quad \text{[Math. 1]}$$

6. A magnetic recording head, which is capable of recording data on the magnetic recording medium, the magnetic recording head comprising:
a first magnetic pole part;
a second magnetic pole part, a gap magnetic field being generated between the first magnetic pole part and the second magnetic pole part; and
a magnetic flux control part provided between the first magnetic pole part and the second magnetic pole part,
wherein the magnetic flux control part comprises:
a first layer being provided as a magnetic flux control layer between the first magnetic pole part and the second magnetic pole part and including at least one element selected from the group consisting of Fe, Co, and Ni;

a second layer provided between the first magnetic pole part and the first layer and including at least one element selected from Pt, W, Ta, Ru, and Pd; and a third layer provided between the second magnetic pole part and the first layer and including at least one element selected from the group consisting of Cu, Ag, and Au, and wherein an oscillation frequency of magnetization of the first layer for recording is greater than a ferromagnetic resonance frequency of the magnetic recording medium while the first layer has a component antiparallel to the gap magnetic field after a magnetization direction of the first layer is inverted.

7. The magnetic recording head according to claim 6, wherein the second layer further comprises at least one element selected from the group consisting of Cu, Ag, and Au.

8. The magnetic recording head according to claim 6 or 7, wherein the second layer is constituted by a laminate having a portion comprising at least one element selected from Pt, W, Ta, Ru, and Pd and a portion comprising at least one element selected from the group consisting of Cu, Ag, and Au.

9. The magnetic recording head according to claim 6, wherein the second layer is a laminate having a portion comprising at least one element selected from Pt, W, Ta, Ru, and Pd in the vicinity of a surface contacting the first magnetic pole part.

10. The magnetic recording head according to claim 6, wherein the second layer is a laminate having a portion comprising at least one element selected from Pt, W, Ta, Ru, and Pd in the vicinity of a surface contacting the first layer.

11. The magnetic recording head according to claim 6, wherein the second layer is a laminate having a portion comprising at least one element selected from Pt, W, Ta, Ru, and Pd in the vicinity of a surface contacting the first magnetic pole part and a surface contacting the first layer.

12. A magnetic recording apparatus comprising:
the magnetic recording head according to claim 6;
a magnetic recording medium on which information is recorded by the magnetic recording head; and
a first electric circuit, which is capable of supplying a current to the magnetic flux control part of the magnetic recording head.

13. The magnetic recording apparatus according to claim 12, further comprising a second electric circuit,
wherein the magnetic recording head further comprises a coil, and
the second electric circuit is capable of supplying a current corresponding to the information to the coil.

14. A magnetic recording head, which is capable of recording data on the magnetic recording medium, the magnetic recording head comprising:
a first magnetic pole part;
a second magnetic pole part; and
a magnetic flux control part provided between the first magnetic pole part and the second magnetic pole part,
wherein the magnetic flux control part comprises:
a first layer being provided as a magnetic flux control layer between the first magnetic pole part and the second magnetic pole part and including at least one element selected from the group consisting of Fe, Co, and Ni;
a second layer provided between the first magnetic pole part and the first layer and including at least one element selected from the group consisting of Cu, Ag, and Au; and
a third layer provided between the second magnetic pole part and the first layer and including at least one element selected from Pt, W, Ta, Ru, and Pd, and
wherein a film thickness of the first layer is thicker than a film thickness of the second layer and the third layer.

15. The magnetic recording head according to claim 14, wherein the third layer further comprises at least one element selected from the group consisting of Cu, Ag, and Au.

16. The magnetic recording head according to claim 14 or 15, wherein the third layer is constituted by a laminate having a portion comprising at least one element selected from Pt, W, Ta, Ru, and Pd and a portion comprising at least one element selected from the group consisting of Cu, Ag, and Au.

17. The magnetic recording head according to claim 14, wherein the third layer is a laminate having a portion comprising at least one element selected from Pt, W, Ta, Ru, and Pd in the vicinity of a surface contacting the first layer.

18. The magnetic recording head according to claim 14, wherein the third layer is a laminate having a portion comprising at least one element selected from Pt, W, Ta, Ru, and Pd in the vicinity of a surface contacting the second magnetic pole part.

19. The magnetic recording head according to claim 14, wherein the third layer is a laminate having a portion comprising at least one element selected from Pt, W, Ta, Ru, and Pd in the vicinity of a surface contacting the second magnetic pole part and a surface contacting the first layer.

20. The magnetic recording head according to claim 14, wherein an oscillation frequency of the first layer is greater than 35 GHz in a recording operation.

* * * * *